(12) United States Patent
McReynolds et al.

(10) Patent No.: US 7,806,333 B1
(45) Date of Patent: Oct. 5, 2010

(54) TRACKING RFID TAGS WITH OVERLAPPING ANTENNAS

(75) Inventors: Alan McReynolds, Los Altos, CA (US); Cyril Brignone, Mountain View, CA (US); Geoffrey Lyon, Menlo Park, CA (US); Ian Robinson, Pebble Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 472 days.

(21) Appl. No.: 11/582,753

(22) Filed: Oct. 18, 2006

Related U.S. Application Data

(63) Continuation-in-part of application No. 11/389,751, filed on Mar. 27, 2006, and a continuation-in-part of application No. 11/389,750, filed on Mar. 27, 2006.

(51) Int. Cl.
*G06K 7/08* (2006.01)

(52) U.S. Cl. .................. 235/450; 235/492; 235/449

(58) Field of Classification Search ......... 235/449–451, 235/492, 493; 340/572.7
See application file for complete search history.

(56) References Cited

U.S. PATENT DOCUMENTS

| | | | |
|---|---|---|---|
| 3,864,043 A | 2/1975 | Russell | |
| 4,636,634 A | 1/1987 | Harper et al. | |
| 4,839,875 A | 6/1989 | Kuriyama et al. | |
| 4,903,815 A | 2/1990 | Hirschfeld et al. | |
| 5,038,023 A | 8/1991 | Saliga | |
| 5,216,618 A | 6/1993 | Arita et al. | |
| 5,303,214 A | 4/1994 | Kulakowski et al. | |
| 5,418,732 A | 5/1995 | McFadin | |
| 5,455,409 A | 10/1995 | Smith et al. | |
| 5,583,819 A | 12/1996 | Roesner et al. | |
| 5,771,003 A | 6/1998 | Seymour | |
| 5,869,820 A | 2/1999 | Chen et al. | |
| 5,963,134 A | 10/1999 | Bowers et al. | |
| 5,991,759 A | 11/1999 | Knoblock et al. | |
| 6,127,928 A | 10/2000 | Issacman et al. | |
| 6,335,686 B1 | 1/2002 | Goff et al. | |
| 6,407,933 B1 | 6/2002 | Bolognia et al. | |
| 6,448,886 B2 | 9/2002 | Garber et al. | |
| 6,462,670 B1 | 10/2002 | Bolognia et al. | |
| 6,473,762 B1 | 10/2002 | Knoblock et al. | |
| 6,598,789 B1 | 7/2003 | Matsumoto et al. | |
| 6,681,990 B2 | 1/2004 | Vogler et al. | |
| 6,703,935 B1 | 3/2004 | Chung et al. | |
| 6,714,121 B1 * | 3/2004 | Moore | 340/10.3 |
| 6,784,802 B1 | 8/2004 | Stanescu | |
| 6,847,856 B1 * | 1/2005 | Bohannon | 700/115 |
| 6,946,950 B1 | 9/2005 | Ueno et al. | |
| 7,439,862 B2 | 10/2008 | Quan | |
| 7,468,669 B1 | 12/2008 | Beck et al. | |
| 2003/0174099 A1 | 9/2003 | Bauer et al. | |

(Continued)

*Primary Examiner*—Karl D. Frech

(57) ABSTRACT

A system for tracking RFID tags with a reader device having a plurality of antennas. The antennas are positioned such that portions of at least two of the plurality of antennas physically overlap each other and are in approximately the same plane. A pair of overlapping antennas are also positioned so that an RFID tag is positioned within both signal fields of the pair of overlapping antennas. In addition, the reader device is configured to selectively activate the plurality of overlapping antennas to thereby selectively interrogate one or more of the RFID tags, and the reader device is configured to use the selective interrogation of the one or more RFID tags to track the locations of the RFID tags.

20 Claims, 13 Drawing Sheets

U.S. PATENT DOCUMENTS

| | | |
|---|---|---|
| 2004/0100413 A1* | 5/2004 | Waldner ..................... 343/742 |
| 2004/0164864 A1* | 8/2004 | Chung et al. ............. 340/572.7 |
| 2005/0184856 A1 | 8/2005 | Pourchot |
| 2005/0215119 A1 | 9/2005 | Kaneko |
| 2005/0219050 A1 | 10/2005 | Martin |
| 2006/0017634 A1 | 1/2006 | Meissner |
| 2007/0040687 A1 | 2/2007 | Reynolds |
| 2007/0252698 A1 | 11/2007 | Turner |

* cited by examiner

TRACKING RFID TAGS WITH OVERLAPPING ANTENNAS

PRIORITY

This application claims priority to and is a Continuation-In-Part of commonly assigned U.S. patent application Ser. No. 11/389,751, filed on Mar. 27, 2006, entitled "RFID ENABLED CABLE TRACKING", and is a Continuation-In-Part of commonly assigned U.S. patent application Ser. No. 11/389,750, filed on Mar. 27, 2006, entitled "READER DEVICE HAVING CLOSELY PACKED ANTENNAS", the disclosures of which are hereby incorporated by reference in their entireties.

BACKGROUND

A data path in a data center typically consists of several cables connected end to end, often using a patch panel, which is generally defined as a device containing pairs of passive sockets. Typically, two optical fiber cables are joined by physically inserting one end of each cable into one side (front or back) of a socket pair. In addition, optical fiber cables have separate transmit and receive lines and each connection consists of two cable ends. Thus, in a conventional rack mounted patch panel having 24 connections per panel, there are up to 96 optical fiber cables leading to the patch panel. In addition, a conventional rack can accommodate 47 patch panels, resulting in a maximum of 4512 cables leading in and out of a rack. Moreover, relatively large data centers could contain hundreds if not thousands of racks, each with thousands of cables.

The physical presence and locations of items in a data center, including the cables described above, as well as other assets in the data center, are typically determined manually. For example, during an inventory process, a network administrator typically walks from rack to rack around the data center and manually records the presence and location of each item in the data center. The network administrator also typically determines whether various items are correctly connected to each other as well as whether the items have been moved or replaced. Manual review and recordation of such information is time consuming, costly, and overly susceptible to human error.

The difficulties in manually tracking the cables, is further exacerbated by the fact that only the front or back side of a patch panel is visible at any one time, thus making it more difficult to make a direct confirmation of a completed junction. Moreover, the density of connections and the awkward positioning of cables present a major challenge in documenting which cables are disconnected, which are connected, and to what they are connected.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a system and a method for tracking cables using a reader device configured to interrogate RFID tags. More particularly, for instance, the system is configured to automatically determine one or both of the identities and locations of the cables. In one example, the reader device includes antennas placed near cable sockets which are configured to receive ends of the cables and to support the cables to, for example, maintain cables in substantially aligned positions. In another example, the reader device includes overlapping antennas configured to emit a relatively large resonance signal field to interrogate the RFID tags. In either example, the disclosed system may be employed to track the cables that are inserted into the cable sockets.

Through implementation of the system and method disclosed herein, an up-to-date inventory of the cables may be created and maintained without requiring that the cables be manually tracked. As such, the cables may be tracked in a relatively efficient and cost-effective manner as compared with conventional cable tracking techniques.

According to a second embodiment, physically overlapping antennas may be employed to track the locations of tags, and therefore the items to which the tags are associated, with a reader device. Additionally, the physically overlapping antennas may selectively be activated to thereby interrogate one or more of the tags. In one respect, the tags, and therefore the items to which the tags are associated, may be tracked in a relatively inexpensive manner without substantial loss in accuracy. Examples of items that may be tracked include, for instance, various assets in a data center environment, products contained in retail or other environments, automated component storage and retrieval systems, etc. Thus, although particular reference is made to tracking assets in data centers, it should be understood that various principles disclosed herein may be applied to track various other items, such as, consumer goods, bulk items, items arranged in various configurations, or other types of products or items.

Figure 1:
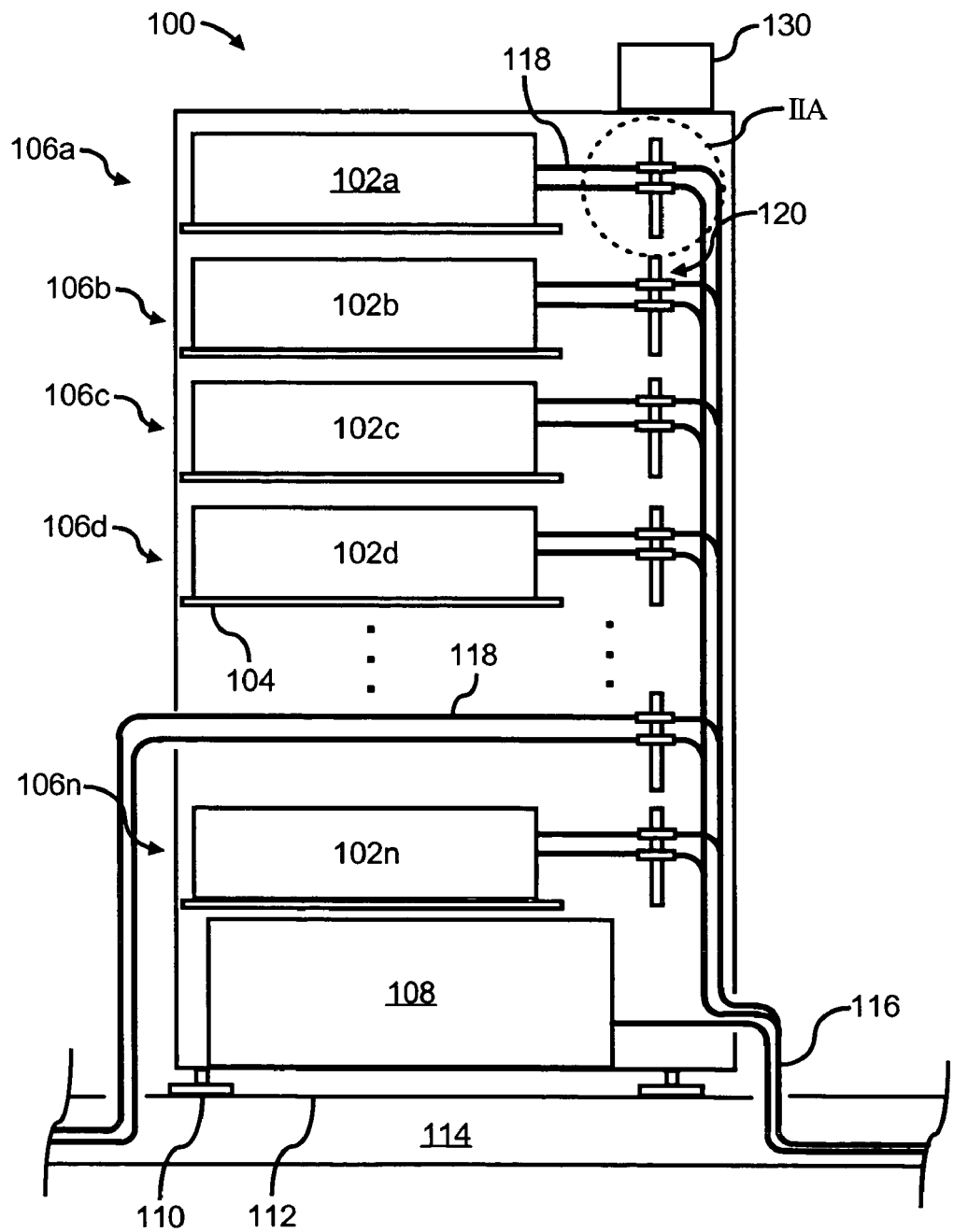
FIG. 1 shows a simplified schematic side view of a rack in which the cable tracking system disclosed herein may be practiced, according to an embodiment of the invention.

With reference first to FIG. 1, there is shown a simplified schematic side view of a rack 100 in which the tag tracking system (300, depicted in FIG. 3) described herein may be practiced, according to an example. Although particular reference has been made herein below to the rack 100 as including particular features, it should be understood that the rack 100 may include additional components and that some of the components described herein may be removed and/or modified without departing from a scope of the rack 100.

Generally speaking, the rack 100 may comprise, for instance, an electronics cabinet configured for use in data centers. The rack 100 may thus comprise, for example, an Electronics Industry Association enclosure, 78 in. (2 meters) wide, 24 in. (0.61 meter) wide and 30 in. (0.76 meter) deep. The term "rack" should be understood as including any doors, lids, or other accessories associated with the rack 100 (not shown). In other instances, the rack 100 may comprise a shelf for storing or displaying various products, such as, goods for consumer sale or other products housed for storage in the rack 100. Thus, although particular reference is made below to the rack 100 as comprising an electronics cabinet, it should be understood that the rack 100 may have a broader scope than an electronics cabinet.

As shown, the rack 100 houses a number of assets 102a-102n, where "n" is an integer, zero or greater. The assets 102a-102n may comprise, for instance, computer systems, servers, blade servers, memories, hard drives, power supplies, etc., and are depicted as being housed on shelves 104 in respective bays 106a-106n of the rack 100. One of ordinary skill in the art will recognize that the shelves 104 merely exemplify one of any number of mounting means that are used with commonly available rack apparatuses. Furthermore, the term "bay" is synonymous with slot, opening, location, position, and the like.

The rack 100 is depicted as including a power supply 108 and as being supported by pedestals 110. In addition, the rack 100 is depicted as being supported on a raised floor 112, beneath which is a space 114. As in conventional data centers, various cables 116 may run through the space 114 to the assets 102a-102n housed in the rack 100. The cables 116 may be connected in various manners to the assets 102a-102n to enable data communications between the assets 102a-102n and other variously located assets (not shown). In addition, although the cables 116 have been illustrated as running through the interior of the rack 100, it should be understood that the cables 116 may be positioned outside of the rack 100 without departing from a scope of the rack 100. Furthermore, the cables 116 may extend above the rack 100 without departing from a scope of the rack 100.

The cables 116 are depicted as being connected to patch panels 120. In addition, the patch panels 120 are depicted as being connected to respective assets 102a-102n through other cables 118. Moreover, the other cables 118 are depicted as being connected to the patch panel 120 and extending through and out of the rack 100. In one regard, the patch panels 120 generally operate to maintain the ends of the cables 116, 118 in substantially aligned positions to enable data signals to be transferred between the cables 116, 118. By way of example, the cables 116, 118 may comprise fiber optic cables designed to transmit data through light waves and the patch panels 120 may support the ends of the cables 116, 118 such that the light waves may be transmitted between the cables 116, 118. In addition, the patch panels 120 may be attached in any of a variety of manners to the rack 100. For instance, the patch panels 120 may be removably connected to respective shelves 104, the walls of the rack 100, etc.

As disclosed in greater detail herein below with respect to FIGS. 2A-2F, the patch panels 120 include antennas 222a, 222b, 242a-242n (FIGS. 2A-2E) of a reader device 130. The reader device 130 may be configured to selectively activate the antennas 222a, 222b, 242a-242n to interrogate selected tags 220a, 220b (FIGS. 2A-2F) associated with respective cables 116, 118. In one regard, the information received from the tags 220a, 220b by the reader device 130 may be implemented to track one or both of the identities and the locations of the various cables 116, 118.

Figure 2A:
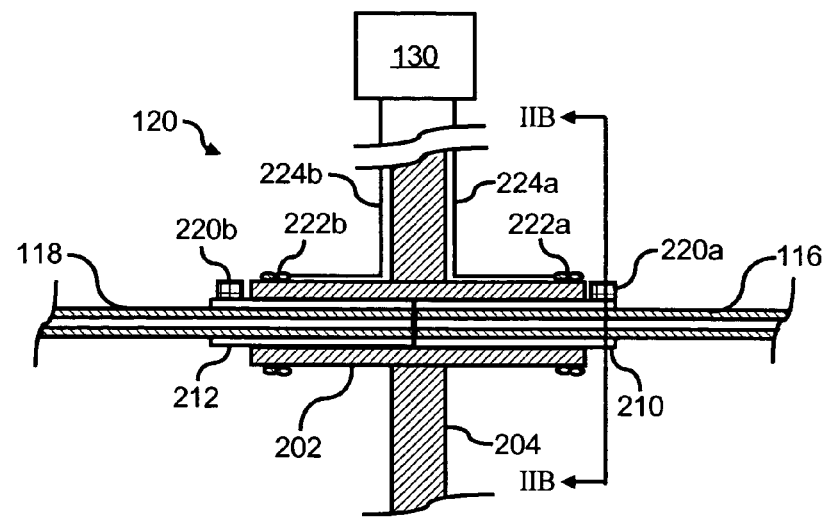
FIG. 2A shows an enlarged, partial and cross-sectional view of a patch panel contained in the dashed circle labeled "IIA" in FIG. 1, according to an embodiment of the invention.
Figure 2B:
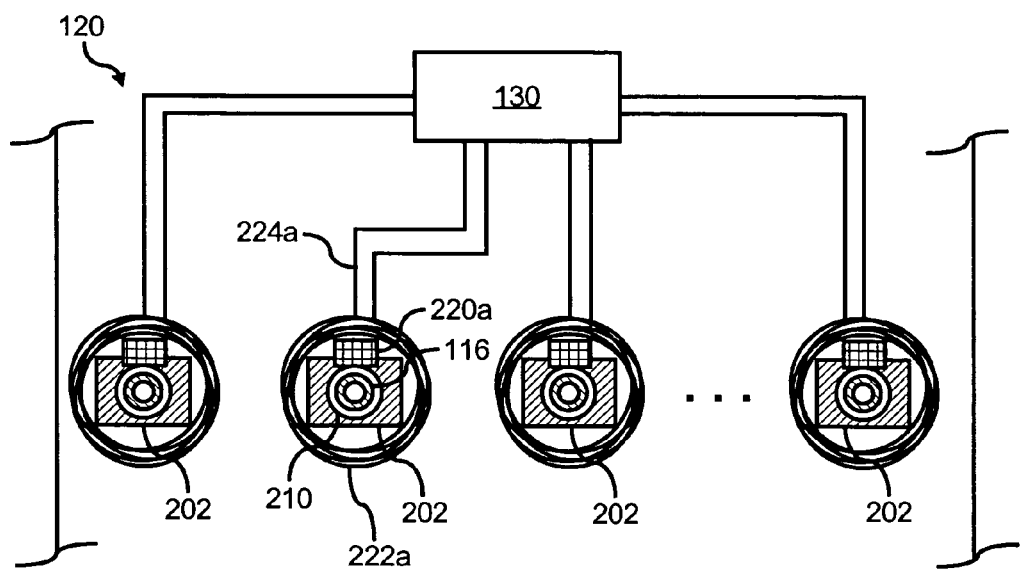
FIG. 2B shows a rear view, partially in cross-section, of the patch panel taken along lines "IIB-IIB" in FIG. 2A, according to an embodiment of the invention.
Figure 2C:
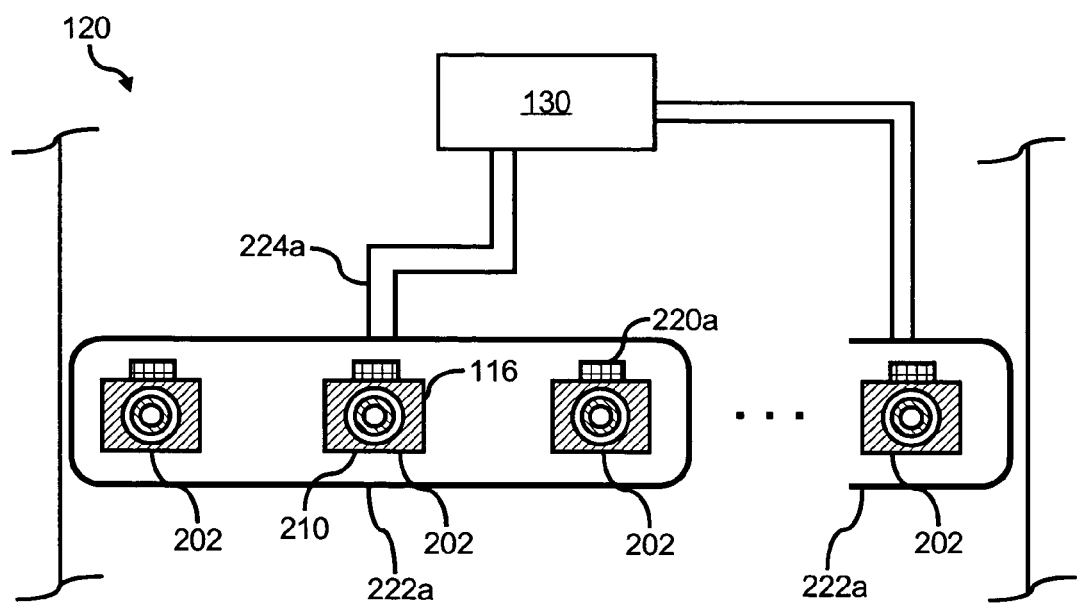
FIG. 2C shows a rear view, partially in cross-section, of the patch panel similar to FIG. 2B, according to another embodiment of the invention.
Figure 2D:
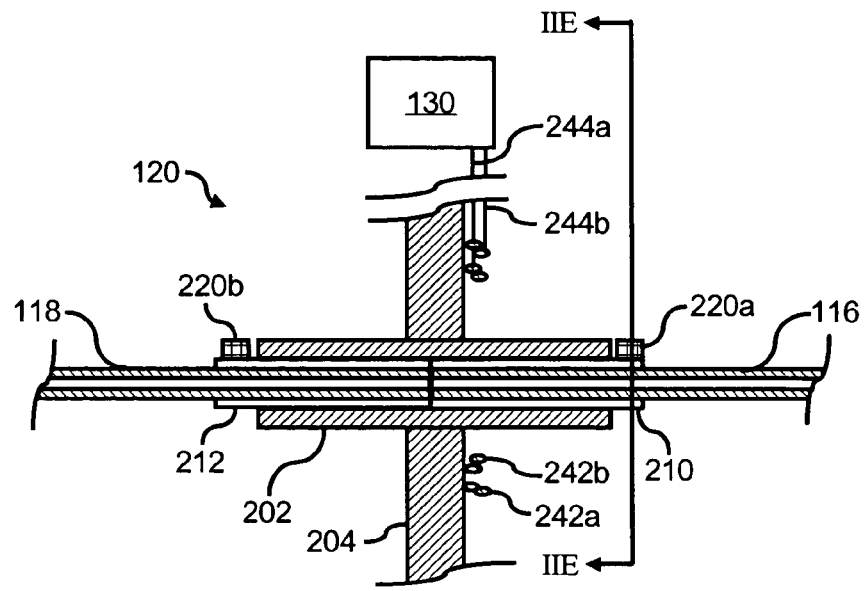
FIG. 2D shows an enlarged, partial and cross-sectional view of a patch panel contained in the dashed circle labeled "IIA" in FIG. 1, according to another embodiment of the invention.
Figure 2E:
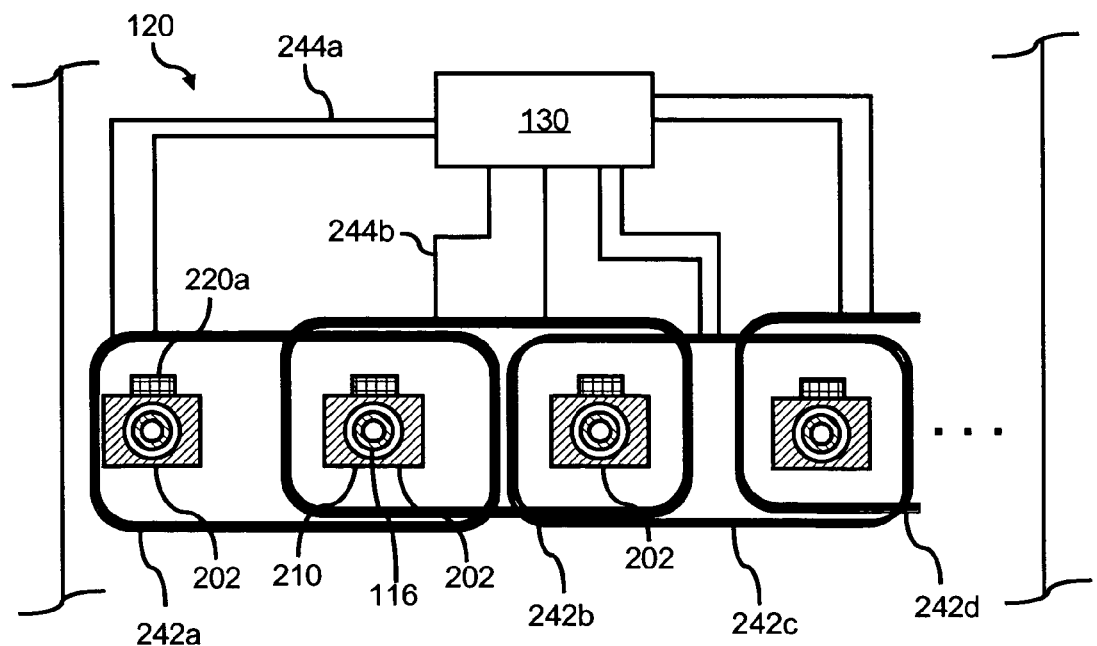
FIG. 2E shows a rear view, partially in cross-section, of the patch panel taken along lines "IIE-IIE" in FIG. 2D, according to an embodiment of the invention.
Figure 2F:
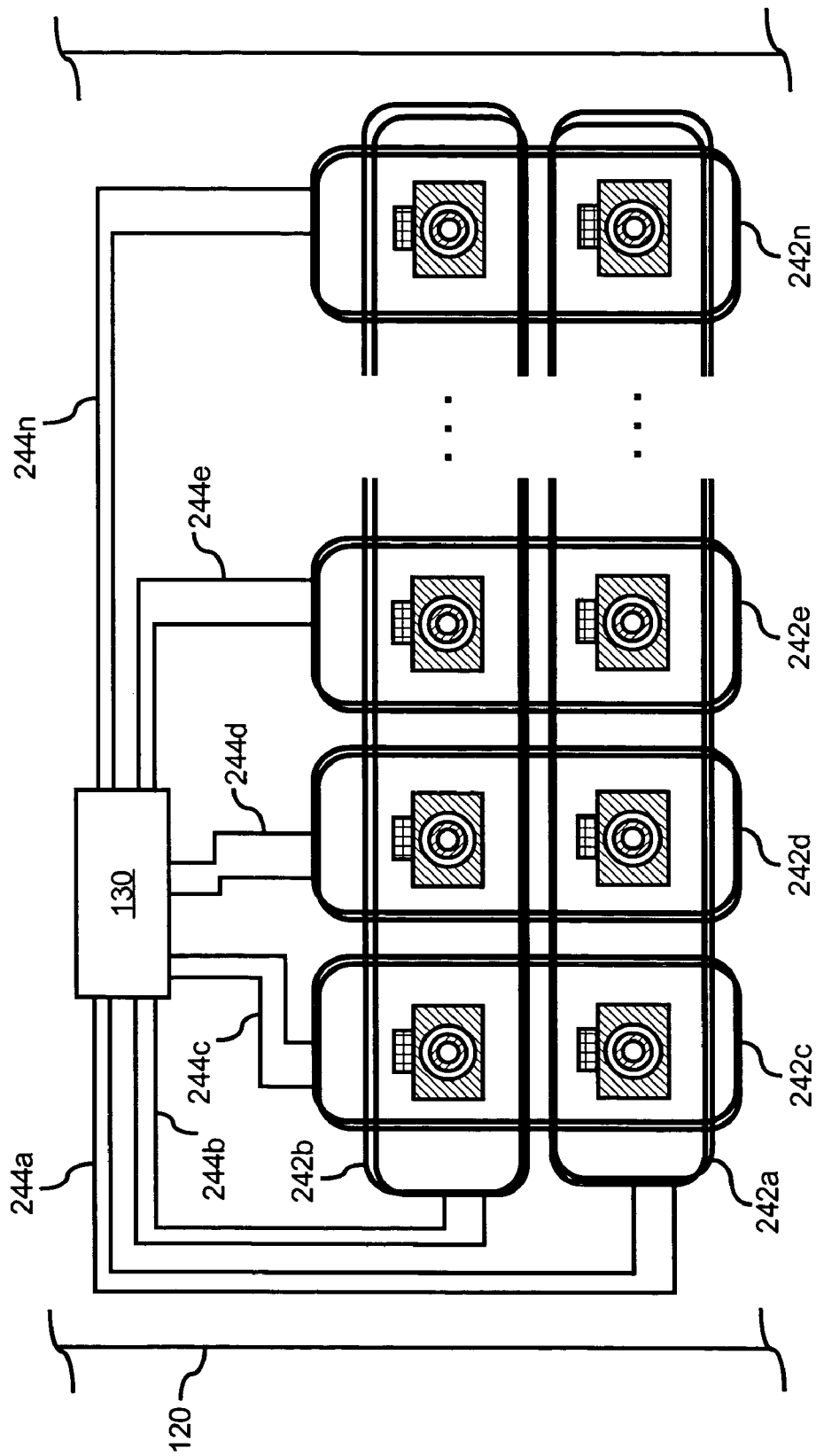
FIG. 2F shows a rear view, partially in cross-section, of the patch panel similar to FIG. 2E, according to another embodiment of the invention.
Figure 2G:
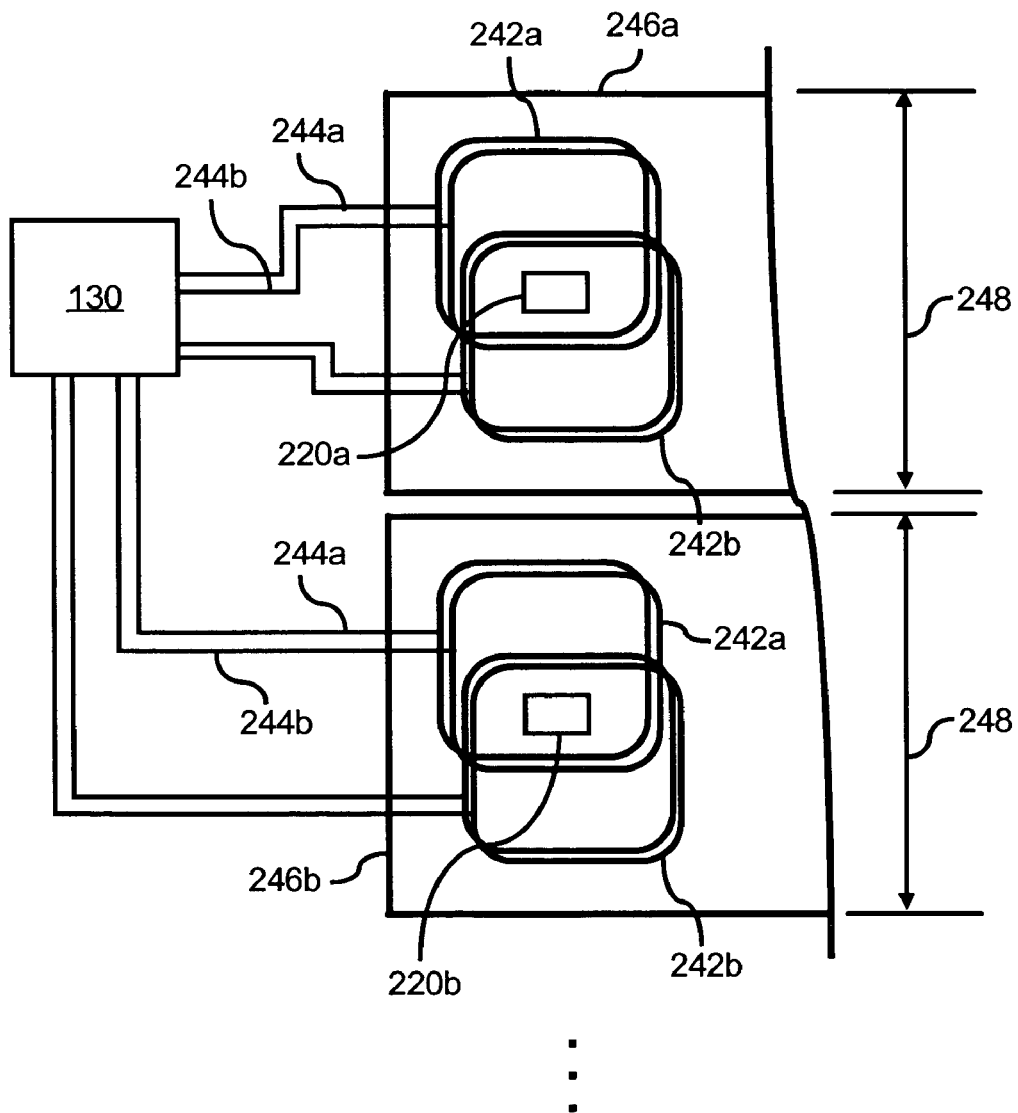
FIG. 2G shows a schematic diagram of a reader device having overlapping antennas, according to an embodiment of the invention.
Figure 2H:
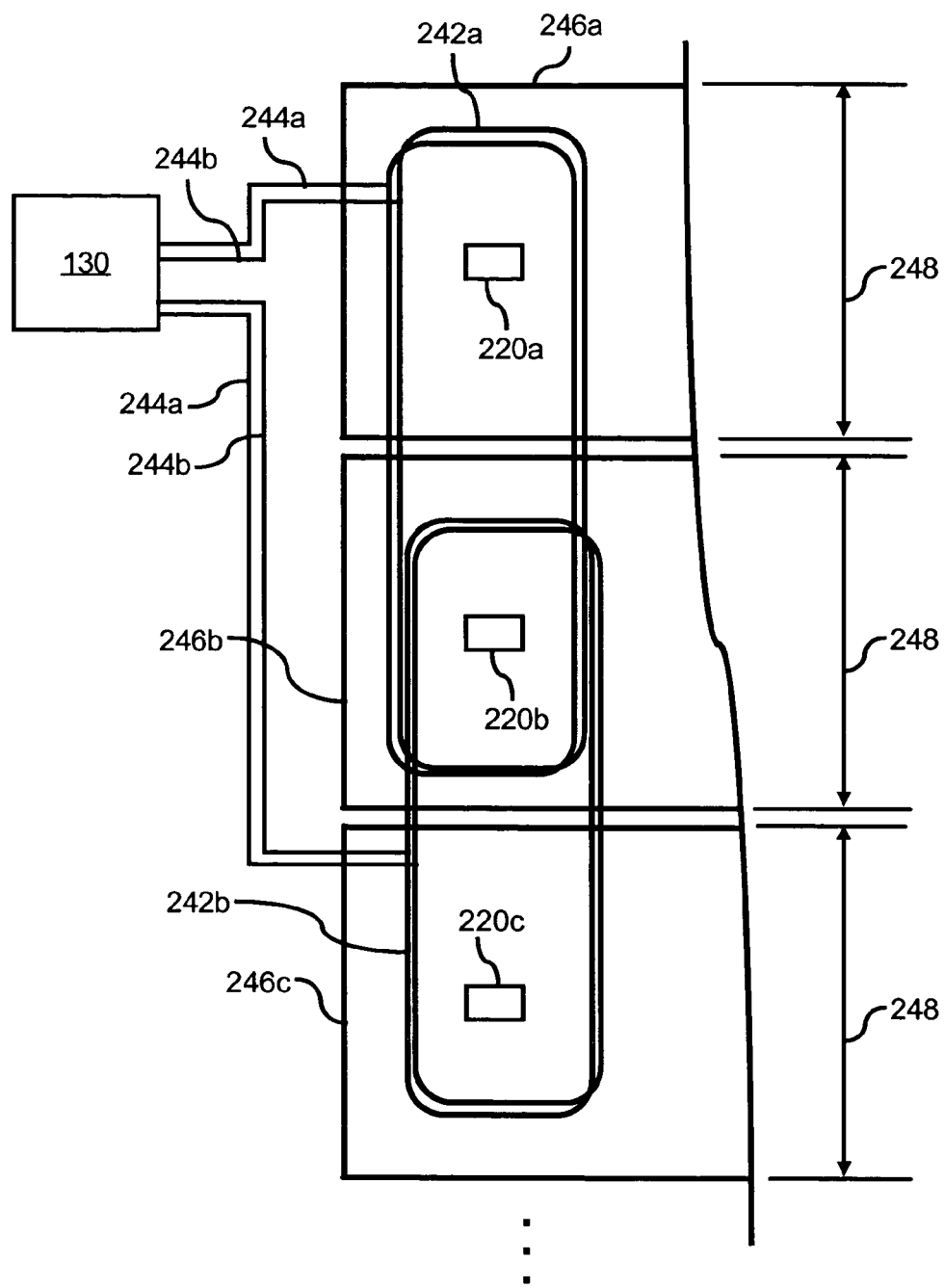
FIG. 2H shows a schematic diagram of a reader device having overlapping antennas, according to another embodiment of the invention.

In addition, or alternatively, as shown in FIGS. 2G and 2H, antennas 242a-242n may be positioned to track tags 220a-220n placed on various items 246a-246n, such as the assets 102a-102n depicted in FIG. 1. The antenna pairs 242a and 242b may comprise separate loop antennas having respective communication line pairs 244a and 244b. Although not shown, the antennas 242a and 242b may be positioned to track tags 220a-220n positioned on or otherwise associated with other types of items, such as, consumer goods, electronics equipment for sale or storage, prescription drugs, etc. In any regard, and as described in greater detail herein below, the antennas 242a and 242b may selectively be activated to track the tags 220a-220n and thereby track the locations of the various items. In addition, the antenna pairs 242a and 242b may be configured to track the locations of items 246a-246n contained in various types of housings, such as, the rack 100, shelves, bins, etc. Moreover, the antenna pairs 242a and 242b may be arranged to track the locations of the tags 220a-220n that are placed along horizontal configurations with respect to each other. In this regard, the antenna pairs 242a and 242b may be employed to track the positions of the tags 220a-220n along one or more dimensions or planes.

Although particular reference is made to a single reader device 130 in FIGS. 2A-2H, it should be understood that a number of reader devices 130 may be employed to track the tags 220a-220n. In addition, the reader device 130 has been illustrated in FIG. 1 as forming a component positioned outside of the enclosure formed by the rack 100, it should, however, be understood that the reader device 130 may also be housed within the enclosure formed by the rack 100. Moreover, the reader device 130 may comprise one or more circuit boards extending within the rack 100 as described herein below with respect to FIG. 3.

With particular reference now to FIG. 2A, there is shown an enlarged, partial and cross-sectional view of the patch panel 120 contained in the dashed circle labeled "IIA" in FIG. 1, according to a first example. It should be understood that the following description of the particular patch panel 120 may also be applicable to the remaining patch panels 120 depicted in FIG. 1.

As shown, the patch panel 120 is depicted as including a cable socket 202 connected to a substantially vertically extending support 204. Although a single cable socket 202 has been depicted in FIG. 2A, the patch panel 120 may include any reasonably suitable number of cable sockets 202 arranged in a horizontal or vertical configuration with respect to each other. In any regard, the cable socket 202 comprises a generally hollow structure into which ends of the cables 116 and 118 are inserted. In addition, the cables 116, 118 each include a respective connector 210 and 212. The connectors 210, 212 may comprise any reasonably suitable configuration capable of being inserted into the cable socket 202. Moreover, the cable socket 202 and the connectors 210, 212 may comprise any reasonably suitable known complementary structures configured to enable the connectors 210, 212 to be removably held within the cable socket 202. For instance, the cable socket 202 and the connectors 210, 212 may include structures configured to releaseably mate with each other.

Positioned on each of the connectors 210 and 212 are respective tags 220a and 220b. The tags 220a, 220b may be encoded with any reasonably suitable identification, such as identifications of the cables 116, 118 with which the tags 220a, 220b are associated. The tags 220a, 220b may include additional information, such as, the dates the cables 116, 118 were installed, the identification of the technician who installed the cables, the cable manufacturers, identifications of the assets to which the cables 116, 118 are attached, the cable 116, 118 specifications, etc.

In any regard, the tags 220a, 220b may comprise, for instance, radio frequency identification (RFID) tags programmed with substantially unique identification codes that may be used to identify the cables 116, 118 to which the tags 220a, 220b are attached. In one example, the tags 220a, 220b may comprise passive devices and may be powered through receipt and conversion of RF signals. In another example, the tags 220a, 220b may comprise active devices, and may thus draw power from one or more power sources. In yet another example, the tags 220a, 220b may comprise a combination of passive and active devices. That is, for instance, one or more of the tags 220a, 220b may include power sources that may be deactivated until an activating signal is received and the one or more of the tags 220a, 220b are passively activated.

As defined herein, the term "tag" may be defined as hardware, information, signals, and the like, that are not necessarily intrinsic to the cables 116, 118 to which the tags 220a, 220b are associated. In other words, the tags 220a, 220b may be internally or externally attached to respective cables 116, 118 and may be independent of the respective cables 116, 118. By way of example, the tags 220a, 220b may be attached to the respective connectors 210, 212 through use of adhesives, adhesive tape, mechanical fasteners and the like. Alternatively, the tags 220a, 220b may comprise a relatively thin and flexible material, such as a wire, that may be wrapped around the connectors 210, 212.

Those skilled in the art will recognize that many other methods of physically associating the tags 220a, 220b with respective cables 116, 118 are possible and that the present invention is not limited to the examples set forth herein. In other words, it is not necessary to mount the tags 220a, 220b exactly as shown and it is contemplated that the tags 220a, 220b may be located at any other reasonably suitable location with respect to the cables 116, 118, so long as the antennas 222a, 222b of a reader device (shown in FIG. 3) are capable of interrogating the tags 220a, 220b. Thus, for instance, the tags 220a, 220b may be attached directly to the cables 116, 118 instead of the connectors 210, 212. In addition, the tags 220a, 220b may be retrofitted to existing cables 116, 118 or connectors 210, 212 through any of the attachment manners described above.

In one example, the tags 220a, 220b may be positioned on the cables 116, 118 or the connectors 210, 212 such that the tags 220a, 220b, are within range of the antennas 222a, 222b, 242a-242n when the connectors 210, 212 are substantially fully inserted into the cable sockets 202. In this regard, the reader device 130 may detect the presence of a cable 116, 118 substantially only when the cable 116, 118 is substantially correctly inserted into the cable sockets 202.

The antennas 222a, 222b are depicted as being positioned near respective ends of the cable socket 202. The antennas 222a, 222b generally comprise loop antennas and may be positioned, for instance, to enable the antennas 222a, 222b to interrogate associated tags 220a, 220b. A tag 220a, 220b may be considered as being associated with an antenna 222a, 222b, if the tag 220a, 220b is either configured to be interrogated by the antenna 222a, 222b or if the tag 220a, 220b is within a resonance signal field of the antenna 222a, 222b. In one example, the antenna 222a may be implemented to interrogate associated tag 220a and the antenna 222b may be implemented to interrogate associated tag 220b. In other examples, the antenna 222a, 222b, may be implemented to interrogate multiple tags 220a, 220b associated with the antennas 222a, 222b.

The reader device 130 may selectively activate the antennas 222a, 222b to interrogate the tags 220a, 220b. In this regard, for instance, the reader device 130 may selectively cause the antennas 222a, 222b to emit resonance signals toward their associated tags 220a, 220b. If the tags 220a, 220b comprise passive or semi-passive tags, the tags 220a, 220b may convert the resonance signals emitted by the antennas 222a, 222b to electrical energy, which the tags 220a, 220b may use to transmit information, such as, identification information, back to the antennas 222a, 222b. If the tags 220a, 220b comprise active tags, the tags 220a, 220b may use an internal power source (not shown) to transmit information back to the antennas 222a, 222b.

In any regard, the information received from the tags 220a, 220b may be transmitted or otherwise communicated to other components of the reader device 130 through communication line pairs 224a, 224b. The other components of the reader device 130 are described in greater detail herein below with respect to FIG. 3.

Although not shown, the antennas 222b (FIG. 2A) may be omitted from the patch panel 120 without departing from a scope of the patch panel 120. In this example, the reader device 130 may be configured to interrogate tags 220a associated with cables 116 inserted into the cable socket 202 from a single direction. As such, it should be understood that the reader device 130 may be operable to track single sets of cables 116 and thus does not necessarily have to track aligned cables 116, 118. In addition or alternatively, a single antenna 222a may be positioned and configured to interrogate both sets of tags 220a, 220b.

With reference now to FIG. 2B, there is s shown a rear view, partially in cross-section, of the patch panel 120 taken along lines "IIB-IIB" in FIG. 2A. The patch panel 120 is depicted as including a plurality of cable sockets 202 arranged horizontally across the width of the patch panel 120. The ellipses between some of the cable sockets 202 generally indicate that the patch panel 120 may include any reasonably suitable number of cable sockets 202. In this regard, the patch panel 120 enables a plurality of first cables 116 to be positioned and held in a substantially aligned arrangement with a corresponding plurality of second cables 118. In addition, through use of the reader device 130 and the antennas 222a, 222b, one or both of the identities and locations of the cables 116, 118 may be determined and monitored.

In another example, a smaller number of antennas 222a, 222b than tags 220a, 220b may be employed, for instance, in situations where knowledge of the exact locations of the cables 116, 118 is not required. The portion of the patch panel 120 depicted in FIG. 2C is an example where a lesser number of antennas 222a, 222b are employed to track the cables 116, 118. In FIG. 2C, the antennas 222a are depicted as being relatively larger than the antennas 222a depicted in FIG. 2B. In this regard, the antennas 222a depicted in FIG. 2C are operable to interrogate multiple tags 220a, 220b. More particularly, each of the antennas 222, 222b is depicted as being positioned to interrogate three tags 220a.

In one regard, the antennas 222a depicted in FIG. 2C may be employed to determine which cables 116, 118 are located in which patch panel 120, for example, through use of a binary tree-search algorithm to determine the number of tags 220a, 220b each antenna 222a, 222b is able to interrogate. In addition, the antennas 222a, 222b may be employed to determine more general locations of the cables 116, 118 attached to the patch panel 120, such as, a bottom half, a top quarter, etc., of the racks 304.

According to another example, and as shown in FIGS. 2D-2F, overlapping antennas 242a-242n may be employed to interrogate the tags 220a, 220b. FIGS. 2D and 2E, more particularly, depict enlarged, partial and cross-sectional views of the patch panel 120 contained in the dashed circle labeled "IIA" in FIG. 1, according to two other examples. In addition, FIG. 2E depicts a rear view, partially in cross-section, of the patch panel 120 taken along lines "IIE-IIE" in FIG. 2D, according to an example. Furthermore, FIG. 2F depicts a rear view, partially in cross-section, of the patch panel 120 according to another example.

FIGS. 2D-2F depict many of the same elements as those depicted in FIGS. 2A-2C. As such, descriptions of those common elements are not provided again with respect to FIGS. 2D-2F. Instead, the discussion of FIGS. 2A-2C is relied upon as providing sufficient descriptions of these common elements. In addition, therefore, only those elements that differ from those depicted in FIGS. 2A-2C are described herein below.

As shown in FIGS. 2D-2F, overlapping antennas 242a-242n are employed to interrogate the tags 220a, 220b instead of the antennas 222a, 222b. Portions of the antennas 242a-242n overlap each other because the antennas 242a-242n are relatively larger than the antennas 222a, 222b depicted in FIGS. 2A-2C. In this regard, the antennas 242a-242n depicted in FIGS. 2D-2F are capable of emitting a relatively larger resonance signal field as compared with the antennas 222a, 222b depicted in FIGS. 2A-2C. In addition, the relatively larger resonance signal field may afford the antennas 242a-242n with the ability to interrogate tags 220a, 220b that are located in positions relatively far from the antennas 242a-242n, multiple tags 220a, 220b, or both.

As also shown in FIGS. 2D-2F, signals between the reader device 130 and the antennas 242a-242n are transmitted through respective communication line pairs 244a-244n.

With particular reference now to FIG. 2E, the antennas 242a-242n are depicted as being situated to interrogate the tags 220a, 220b of cables 116, 118 inserted into multiple cable sockets 202. More particularly, for instance, the antenna 242a is depicted as being situated to interrogate the tags 220a, 220b of the first two cable sockets 202 and the antenna 242b is depicted as being situated to interrogate the tags 220a, 220b of the second two cable sockets 202. In this example, the reader device 130 may determine the locations of the tags 220a, 220b and thus the cables 116, 118 to which the tags 220a, 220b are associated by selectively activating the antennas 242a-242n. The reader device 130 may determine the locations of the tags 220a, 220b by analyzing the information returned from the tags 220a, 220b through activation of the antennas 242a-242n.

More particularly, the reader device 130 may determine that a first set of tags 220a, 220b is associated with the left-most cable socket 202 if these tags 220a, 220b have been detected when they were interrogated through activation of the first antenna 242a. In addition, the reader device 130 may determine that a second set of tags 220a, 220b is associated with the second cable socket 202 located to the right of the left-most cable socket 202 if these tags 220a, 220b have been detected when they were interrogated through activation of both antennas 242a and 242b. Moreover, the reader device 130 may determine that a third set of tags 220a, 220b is associated with the third cable socket 202, which is located to the right of the second cable socket 202, if these tags 220a, 220b have been detected when they were interrogated through activation of the second antenna 242b. The third set of tags 220a, 220b may be associated with the third cable socket 202 if these tags 220a, 220b have been detected when they were interrogated through activation of the second antenna 242b and the third antenna 242c.

The above-described process may be repeated with any number of overlapping antennas 242a-242n to track any number of tags 220a, 220b and the cables 116, 118 associated with the tags 220a, 220b. In addition, although in the example shown in FIG. 2E, each of the antennas 242a-242n is illustrated as being configured to interrogate two tags 220a, 220b on each side of the cable socket 202, it should be understood that the antennas 242a-242n may be configured to interrogate any reasonably suitable number of tags 220a, 220b without departing from a scope of the present invention.

For instance, the overlapping antennas 242a-242n may be employed to interrogate tags 220a, 220b as depicted in FIG. 2F. As shown in FIG. 2F, the antennas 242a-242n are depicted as comprising relatively larger sizes as compared with the antennas 242a-242n depicted in FIG. 2E. In this regard, for instance, the antennas 242a-242n depicted in FIG. 2F may have a relatively deeper resonance signal fields as compared with the antennas 222a, 222b and the antennas 242a-242n depicted in FIG. 2E. In addition, the locations of the tags 220a, 220b may be determined by cross-checking the information received through activation of the antennas 242a-242n.

With reference back to FIGS. 2B, 2C, 2E, and 2F, the antennas 222a located on one side of the patch panel 120 are depicted as being closely packed to each other. Although not shown in FIG. 2B, the antennas 222b located on the other side of the patch panel 120 are also closely packed to each other. In addition, certain of the antennas 222a located on one side of the patch panel 120 may be considered as being closely packed with certain of the antennas 222b located on the other side of the patch panel 120. Furthermore, and as shown in FIGS. 2E-2H, the antennas 242a-242n may be considered as being closely packed to each other because the antennas 242a-242n overlap one another.

The antennas 222a, 222b, 242a-242n are termed "closely packed" for purposes of this disclosure to generally indicate that at least one of the antennas 222a, 222b, 242a-242n may be within a resonance signal field of another antenna 222a, 222b, 242a-242n. As such, the terms "closely packed" may also generally indicate that at least one of the antennas 222a, 222b, 242a-242n may become coupled or tuned to a second antenna 222a, 222b when the second antenna 222a, 222b is activated. In addition, an antenna 222a of a first reader device 130 may be considered as being closely packed with an antenna 222a of a second reader device 130. As described in greater detail herein below, the reader device 130 may operate the antennas 222a, 222b, 242a-242n in various manners to substantially prevent cross-coupling and tuning between an active antenna 222a, 222b, 242a-242n and at least one antenna 222a, 222b, 242a-242n within the resonance signal field of the active antenna 222a, 222b, 242a-242n.

According to a further example, and as shown in FIGS. 2G and 2H, the overlapping antennas 242a and 242b, which may be similar to the overlapping antennas discussed with respect to FIGS. 2D-2F, may be employed to track tags 220a-220n positioned or otherwise associated with various items 246a-246n, such as, the assets 102a-102n, various consumer goods, prescription drugs, electronics equipment, bulk items, items arranged in various configurations, etc. In FIGS. 2G and 2H, there are shown simplified schematic illustrations of a system for tracking tags 220a-220n with a reader device 130 having overlapping antennas 242a and 242b, according to two examples.

As shown in both of these figures, the overlapping antennas 242a and 242b may lie in approximately the same plane. In addition, pairs of the overlapping antennas 242a and 242b are positioned with respect to respective tags 220a-220n, such that each of the tags 220a-220n is within the signal fields of both of a pair of overlapping antennas 242a and 242b. In this regard, either or both of the pairs of overlapping antennas 242a and 242b may receive signals from a tag 220a-220n positioned within the common signal field.

Although not shown, the overlapping antennas 242a and 242b may be supported on a door of the rack 100 such that the antennas 242a and 242b are in relatively close proximity to the tags 220a-220n when the door is closed. The relatively close proximity discussed here with respect to the antennas 242a and 242b and the tags 220a-220n generally refers to a sufficiently short distance which enables the reader device 130 to obtain reliable responses from the tags 220a-220n.

In addition, or alternatively, the overlapping antennas 242a and 242b may be positioned in a relatively fixed position with respect to the tags 220a-220n. In this regard, for instance, the overlapping antennas 242a and 242b may be attached to a substrate that is relatively close proximity to the tags 220a-220n. As another example, the overlapping antennas 242a and 242b may be affixed to the assets 102a-102n themselves.

Generally speaking, the tags 220a-220n may be defined as hardware, information, signals, and the like, that are not necessarily intrinsic to the items 246a-246n to which the tags 220a-220n are associated. In other words, the tags 220a-220n may be internally or externally attached to respective items 246a-246n and may be independent of the respective items 246a-246n. By way of example, the tags 220a-220n may be attached to the respective items 246a-246n through use of adhesives, adhesive tape, mechanical fasteners and the like.

Those skilled in the art will recognize that many other methods of physically associating the tags 220a-220n with respective items 246a-246n are possible and that the present invention is not limited to the examples set forth herein. In other words, it is not necessary to mount the tags 220a-220n exactly as shown in FIGS. 2G and 2H and it is contemplated that the tags 220a-220n may be located at any other reasonably suitable location with respect to the items 246a-246n, so long as the overlapping antennas 242a, 242b of a reader device 130 are capable of interrogating one or more of the tags 220a-220n in a substantially reliable manner.

With reference first to FIG. 2G, respective pairs of overlapping antennas 242a and 242b are depicted as being configured to interrogate tags 220a-220n, which may be associated with respective items 246a-246n. In this regard, for instance, each of the respective pairs of overlapping antennas 242a and 242b is configured to interrogate tags 220a-220n positioned within respective measurement units 248 of the items 246a-246n. The measurement units 248 may comprise, for instance, respective heights of the items 246a-246n, respective heights of shelves configured to support or otherwise hold the items 246a-246n, respective widths of the items 246a-246n, or other relatively standardized units of measurement.

Generally speaking, the overlapping antennas 242a and 242b may be employed to interrogate the tags 220a-220n with a relatively higher level of accuracy as compared with the use of single antennas. For instance, since both of the overlapping antennas 242a and 242b may be used to interrogate a single tag 220a, the reader device 130 may determine that a tag 220a is present in a predetermined location if either of the overlapping antennas 242a and 242b receives signals from the tag 220a. The reader device 130 may also determine that a tag 220a is present in the predetermined location if both of the overlapping antennas 242a and 242b receive signals from the tag 220a.

With reference now to FIG. 2H, the antennas 242a and 242b are capable of emitting a relatively larger resonance signal field as compared with the antennas 242a and 242b depicted in FIG. 2G. In addition, the relatively larger resonance signal fields may afford the antennas 242a and 242b with the ability to interrogate tags 220a-220n that are located in positions relatively far from the antennas 242a and 242b, multiple tags 220a-220n, or both. As such, the antennas 242a and 242b depicted in FIG. 2H may not be required to be positioned directly adjacent to the tags 220a, but may instead be positioned with a relatively large gap therebetween, so long as the antennas 242a and 242b are suitably capable of interrogating the tags 220a-220n.

The antennas 242a and 242b are depicted in FIG. 2H as being positioned to interrogate tags 220a-220c. As shown, the first antenna 242a is positioned to interrogate a first tag 220a and a second tag 220b. In addition, the second antenna 242b is positioned to interrogate the second tag 220a and the third tag 220c. Although not shown, a third antenna 242a may be positioned to interrogate the third tag 220c and a fourth tag 220d (not shown), and so forth. An additional antenna 242b may also be positioned to interrogate the first tag 220a.

Although each of the antennas 242a and 242b has been depicted in FIG. 2H as being positioned to interrogate two tags 220a, 220b placed at respective measurement units 248, it should be understood that the antennas 242a and 242b may be positioned and sized to interrogate greater than two tags 220a-220n each, without deviating from a scope of the reader device 130 and the antennas 242a and 242b.

In any regard, the reader device 130 may selectively activate the overlapping antennas 242a and 242b depicted in FIG. 2H to track one or both of the locations and identities of the tags 220a-220n, and, in certain instances, their associated items 246a-246n. In one respect, the reader device 130 may determine that the first tag 220a is in a first location if the first tag 220a responds when interrogated by the first antenna 242a, but does not respond when interrogated by the second antenna 242b. Likewise, the reader device 130 may determine that the second tag 220b is in a second location if the second tag 220b responds when interrogated by the first antenna 242a and also when interrogated by the second antenna 242b. Moreover, the reader device 130 may determine that the third tag 220c is in a third location if the third tag 220c responds when interrogated by the second antenna 242b, but does not respond when interrogated by the first antenna 242a.

As should be clear from the previous discussion, the reader device 130 may continue repeating this process on any further desired tags 220a-220n to thereby track their locations.

Figure 3:
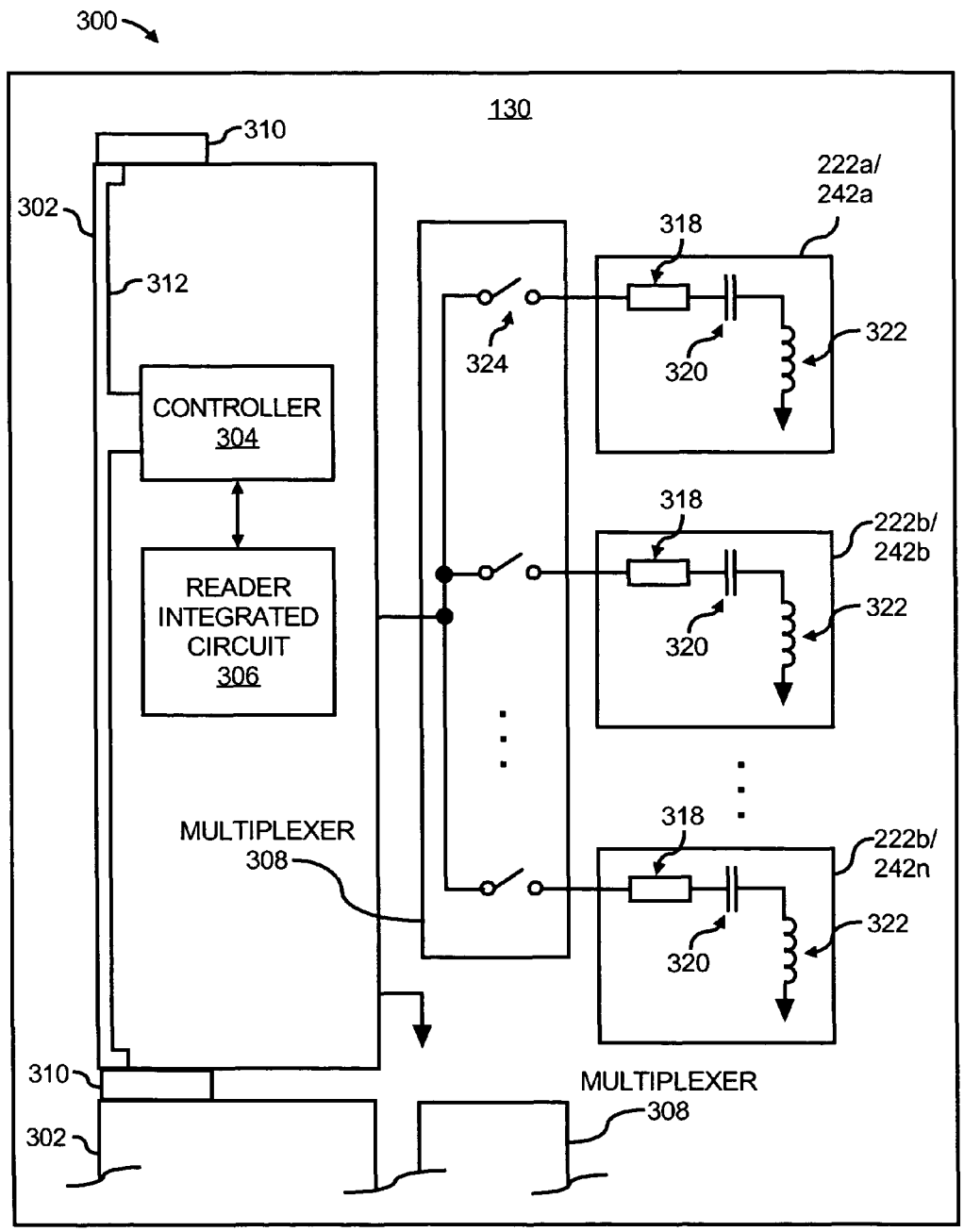
FIG. 3 shows a simplified schematic diagram of a reader device, according to an embodiment of the invention.

With particular reference now to FIG. 3, there is shown a simplified schematic diagram of a tag tracking system 300 having a reader device 130, according to an example. Although particular reference has been made herein below to the tag tracking system 300 as including particular features, it should be understood that the tag tracking system 300 may include additional components and that some of the components described may be removed and/or modified without departing from a scope of the tag tracking system 300.

The tag tracking system 300 is illustrated as including a reader device 130, which is described in greater detail herein below. The tag tracking system 300 may also include a number of tags 220a-220n, which may be associated with a number of items 246a-246n, including the cables 116, 118, to be located and tracked.

The reader device 130 is depicted as including a plurality of reader boards 302 to which the antennas 222a, 222b, 242a-242n are connected for purposes of illustration and not of limitation. Thus, for instance, it should be understood that the reader device 130 may include a single reader board 302 without departing from a scope of the reader device 130.

In one example, the number of reader boards 302 and corresponding antennas 222a, 222b, 242a-242n may be equivalent to the number of patch panels 120 in the rack 100. In another example, a lesser number of reader boards 302 than patch panels 120 may be included in the reader device 130. As shown in greater detail in FIG. 3, the reader boards 302 may each be configured to activate a plurality of closely packed antennas 222a, 222b, including the overlapping antennas 242a-242n depicted in FIGS. 2C-2H. In this regard, some or all of the antennas 242a-242n depicted in FIG. 3 may overlap each other. Moreover, the plurality of reader boards 302 may be configured to enable data to be transferred between the reader boards 302, such as, in a daisy-chain configuration, as described in greater detail herein below.

According to the example depicted in FIGS. 2A and 2B, regardless of the number of reader boards 302 used, the antennas 222a, 222b may be distributed throughout the patch panels 120 in a one-to-one arrangement with the ends of the cable sockets 202, such that each antenna 222a, 222b is associated with a respective cable 116, 118 inserted into the cable sockets 202. The location of each antenna 222a, 222b may be associated with its respective cable socket 202, patch panel 120, and rack 100 location and entered into a memory (not shown). In this regard, the antennas 222a, 222b may be employed to determine whether the cables 116, 118 are located in respective cable sockets 202 through interrogation of the tags 220a, 220b.

Thus, for instance, and with respect to FIG. 2A, the reader device 130 may determine that the cables 116, 118 are connected to the cable socket 202 in the top most patch panel 120 of the rack 100 through receipt of information from the tags 220a, 220b associated with the cables 116, 118. In addition, the reader device 130 may determine that a cable socket 202 is empty if a resonance signal emitted by the antennas 222a, 222b does not return a reply signal from a tag 220a, 220b. Moreover, the reader device 130 may determine that one of the cables 116 is correctly inserted into the cable socket 202 and that the cable 118 is missing.

Referring back to FIG. 3, the reader board 302 includes a controller 304 for controlling the antennas 222a, 222b, 242a-242n and for processing information received from the tags 220a, 220b through the antennas 222a, 222b, 242a-242n. The reader board 302 also includes a reader integrated circuit 306 and a signal multiplexer 308. The reader integrated circuit 306 is generally configured to convert digital signals from the controller 304 into a modulated energizing signal to be sent through the signal multiplexer 308 and to the antennas 222a, 222b, 242a-242n. The reader integrated circuit 306 may also demodulate amplitude variations that may be introduced into the digital signals when a tag 220a, 220b is placed in the resonance signal field of an antenna 222a, 222b, 242a-242n. The reader integrated circuit 306 may further select the appropriate signal processing parameters based upon a chosen protocol. For instance, the reader integrated circuit 306 may output a demodulated tag signal from which the controller 304 may decode to derive the identification and memory contents of an interrogated tag 220a, 220b.

The controller 304 may be programmed to sequentially activate the antennas 222a, 222b, 242a-242n from left-right, vice-versa, or in any desired pattern since the location of each antenna 222a, 222b, 242a-242n is recorded. It is also contemplated that multiple antennas 222a, 222b, 242a-242n may be simultaneously activated, for instance, in configurations where the reader device 130 includes multiple reader boards 302, and thus multiple controllers 304 and multiplexers 308.

In any event, the controller 304 may query the status of any given cable socket 202 by activating the antennas 222a, 222b, 242a-242n to detect the presence or absence of tags 220a, 220b and thus their corresponding items 246a-246n. The locations of the antennas 222a, 222b, 242a-242n may be stored in a memory (not shown) of the controller 304, such as in a non-volatile memory or a separate storage device (not shown). Thus, the controller 304 may correlate the predesignated or known location of each antenna 222a, 222b, 242a-242n to a corresponding detected tag 220a, 220b and associated item 246a-246n. Accordingly, the controller 304 may detect not only the presence of any given item 246a-246n within any given cable socket 202, but may also determine the location of a particular item 246a-246n by the identification code of the item 246a-246n, which may be stored in the tags 220a, 220b.

According to an example, the reader device 130 may comprise at least one radio frequency (RF) reader device and the tags 220a, 220b may comprise radio frequency identification (RFID) devices. In this example, the reader device 130 may transmit an RF signal through respective ones of the antennas 222a, 222b, 242a-242n to thereby interrogate respective ones of the tags 220a, 220b, for instance, in a sequential manner. In response, the tags 220a, 220b may transmit information back to the reader device 130 through respective ones of the antennas 222a, 222b, 242a-242n. The information may include, for instance, a substantially unique identification code for the individual tags 220a, 220b, information pertaining to the cables 116, 118 to which the tags 220a, 220b are associated, and the like. The controller 304 may process the information received from the tags 220a, 220b and/or may transmit the information to another controller or computer system.

According to an example, the reader device 130 may be positioned with respect to the rack 100 to substantially prevent blockage of airflow through the rack 100 as well as access to the assets 102a-102n, the cables 116, 118, and the patch panels 120. In this regard, for instance, the antenna board 302 may be positioned above the rack 100 as shown in FIG. 1, adjacent to a sidewall of the rack 100, on part of a door (not shown), such that the antenna board 124 may be moved from a blocking position when the door is opened and in a substantially reading position when the door is closed, etc.

One of ordinary skill in the art will recognize that the reader board 302 may be mounted to the rack 100 in any reasonably suitable manner, including the use of any of a variety of fastening devices, including tie straps, hook and loop material, screws, mounting brackets, adhesives, and the like.

The controller 304 and the reader integrated circuit 306 are depicted as being configured to communicate with each other and the signal multiplexer 308. In addition, the reader board 302 is depicted as including connectors 310 to which the controller 304 is connected through a serial port 312. By way of example, the connectors 310 may enable data collected from the controller 304 to be communicated to another device, such as another reader board 302, another controller (not shown), etc. In addition, or alternatively, the connectors 310 may enable adjacent reader boards 302 to be physically connected to each other and may comprise any reasonably suitable type of connector, such as, a male/female-type connector. As such, for instance, a plurality of reader boards 302 may be employed to obtain information from a plurality of tags 220a-220n.

The controller 304 may select an antenna 222a, 222b, 242a-242n to activate through operation of the signal multiplexer 308. The controller 304 may also close the switch 324 of a selected antenna 222a, 242a to thereby cause the selected antenna 222a, 242a to emit a resonance signal directed toward an associated tag 220a. If, for instance, a tag 220a is present on a cable 116 connected to the cable socket 202 of the associated patch panel 120, the tag 220a may return a signal back to the controller 304 through the activated antenna 222a, 242a. If, on the other hand, a tag 220a is not present in the cable socket 202, the controller 304 may determine that a cable 116 is not connected to the cable socket 202.

When an antenna circuit 222a, 222b, 242a-242n is activated, the resonance signal emitted by the active antenna circuit 222a, 222b, 242a-242n may also be received by a second antenna circuit 222a, 222b, 242a-242n that may be within the resonating signal field of the active antenna 222a, 222b, 242a-242n. More particularly, the magnetic field generated by an inductor in the first antenna circuit 222a, 222b, 242a-242n may cross-couple into an adjacent antenna circuit 222a, 222b, 242a-242n, causing a secondary current to circulate in the circuit of the adjacent antenna 222a, 222b, 242a-242n. The secondary current, in turn, may cause the magnetic field to be re-radiated via the inductors in the respective antenna circuits 222a, 222b, 242a-242n. This results in the undesirable effect of spreading the magnetic field through the antenna array. This also results in tag 220a, 220b reads coupling across adjacent antenna circuits 222a, 222b, 242a-242n, sometimes with multiple successive hops across multiple antenna circuits 222a, 222b, 242a-242n, so that the relative locations of the tags 220a-220n with respect to the antenna array may be difficult or impossible to determine. In addition, other antenna circuit topologies that contain a permanent resonant circuit loop often exhibit this behavior.

As shown in FIG. 3, and as described in commonly assigned and copending U.S. patent application Ser. No. 11/389,750, however, the antenna circuits 222a, 222b, 242a-242n have been modified to prevent the cross-coupling among the antenna circuits 222a, 222b, 242a-242n from occurring. As discussed in greater detail below, the controller 304 may thus receive data from the desired tags 220a-220n associated with the selected antenna circuits 222a, 222b, 242a-242n without substantial interference from signals that may be received by other antenna circuits 222a, 222b, 242a-242n.

In FIG. 3, the antennas 222a, 222b, 242a-242n are depicted as each comprising RLC circuits, in which, a resistor 318 and a capacitor 320 are placed in series with an inductor 322. In the configuration shown in FIG. 3, the LC components 320, 322 form a frequency tuned series resonant network, where the inductor (L) 322 is the antenna. The resistor 318 is used to control the Q-factor for the antenna circuits 222a, 222b, 242a-242n, which directly influences the time response characteristics and frequency spreading of the antenna circuits 222a, 222b, 242a-242n.

In addition, the antenna circuits 222a, 222b, 242a-242n are depicted as being connected to respective switches 324 of the signal multiplexer 308. Although not shown, the switches 324 may comprise integrated circuits that instead form part of the reader board 302. The switches 324 may, in addition, or alternatively, be implanted using an analog switch integrated circuit, providing the device's operating characteristics, for instance, on resistance, parasitic capacitances and frequency response, are suitable.

The switches 324, when closed, allow the selected antenna circuits 222a, 222b, 242a-242n to emit resonant signal fields configured to interrogate one or more tags 220a-220b and to detect the one or more tags 220a-220b. When the switches 324 of selected antenna circuits 222a, 222b, 242a-242n are opened, the selected antenna circuits 222a, 222b, 242a-242n are isolated from the reader 130 and the selected antenna circuits 222a, 222b, 242a-242n do not form a current loop, and thus substantially prevents cross-coupling with the other antenna circuits 222a, 222b, 242a-242n in the antenna array.

Figure 4A:
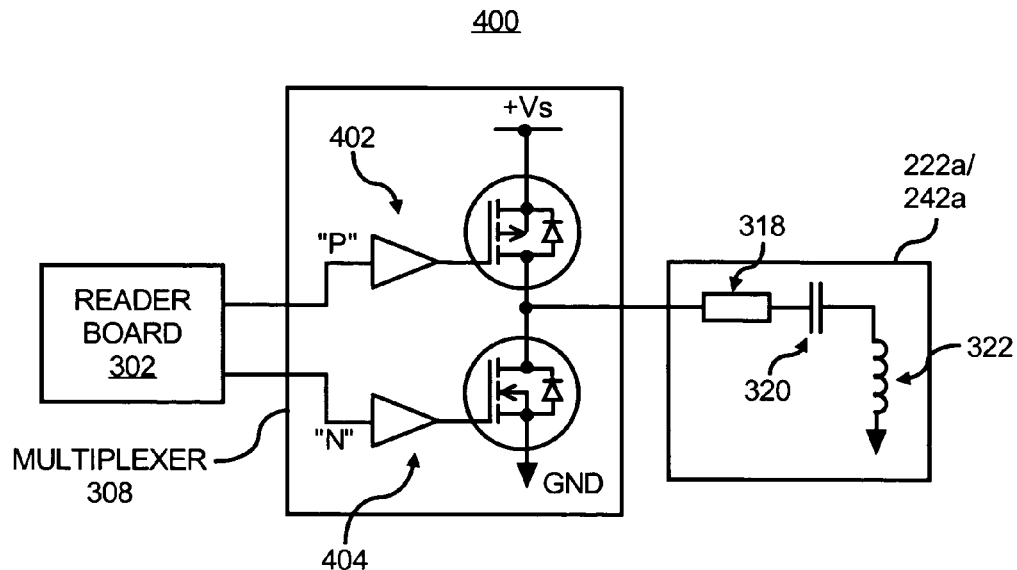
FIGS. 4A-4E depict simplified schematic diagrams of reader devices according to various embodiments of the invention.

A second example of a suitable antenna circuit 222a, 222b, 242a-242n configuration configured to substantially eliminate or reduce cross-coupling is shown with respect to the reader device 400 depicted in FIG. 4A. As shown, a complementary pair of MOSFET transistors 402, 404 is used to generate the energizing signal for each of the RLC antenna circuits 222a, 222b, 242a-242n. The MOSFET gate drive signals ("P" & "N") are driven as in-phase clock signals when the channel is active, causing the selected antenna circuit 222a, 222b, 242a-242n to be toggled between VS and GND at the energizing frequency, for instance, 13.56 MHz for HF RFID. When inactive, "P" is held high and "N" is held low to turn both transistors off and, as in FIG. 3, disconnects selected ones of the antenna circuits 222a, 222b, 242a-242n to avoid cross-coupling between the antenna circuits 222a, 222b, 242a-242n.

It should be noted that in the examples described above with respect to FIGS. 3 and 4A, the circuits have been simplified to highlight the desired functionality and that non-ideal component characteristics, in particular leakage and stray capacitances will degrade the actual circuit performance. However the resulting cross-coupled energy levels, when using appropriately selected components, will be reduced to a level that permits the desired operation of the circuit and where any cross-coupled signals will be a relatively small amplitude and not introduce undesired system behavior.

The RLC circuits of the antennas 222a, 222b, 242a-242n depicted in FIGS. 3 and 4A illustrate two examples of a RLC circuit suitable for substantially preventing cross-coupling of the antenna circuits 222a, 222b, 242a-242n. Additional examples of suitable antenna circuits 222a, 222b, 242a-242n that may be employed to substantially prevent cross-coupling between antennas 222a, 222b, 242a-242n are depicted in FIGS. 4B-4E.

More particularly, FIGS. 4B-4E depict simplified schematic diagrams of reader devices 410, 420, 430, and 440 according to further examples. The reader devices 410, 420, 430, and 440 generally include all of the elements of the reader device 130 depicted in FIGS. 3 and 4A. As such, those elements sharing the same reference numerals are not discussed in great detail herein below with respect to FIGS. 4B-4E. Instead, those features of the reader devices 410, 420, 430, and 440 that differ from the reader devices 130, 400 are discussed. In addition, the ellipses generally indicate that the reader devices 410, 420, 430, and 440 may include any reasonably suitable number of antennas 222a, 222b, 242a-242n.

Figure 4B:
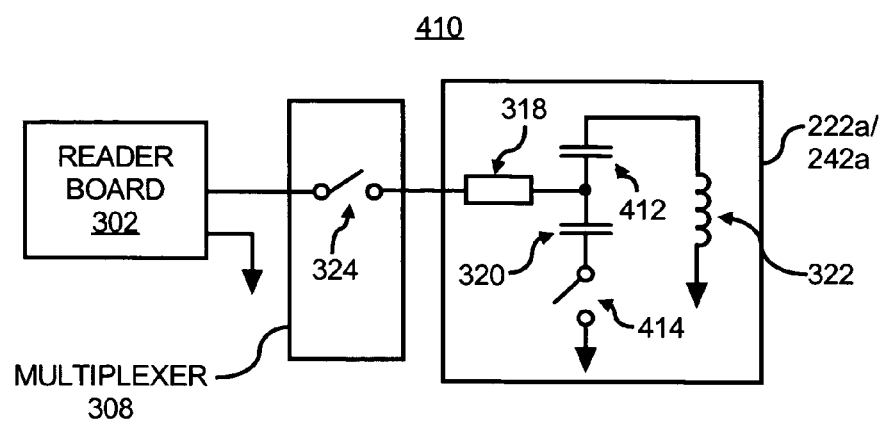

With particular reference first to FIG. 4B, the reader device 410 is depicted as including an additional capacitor 412 and an additional switch 414. The RLC circuit of the antenna 222a, 242a in the reader device 410 may employ the additional switch 414 to substantially break the inductive parallel loop formed by the RLC circuit. As such, the antenna circuit 222a, 242a may be further decoupled from an active antenna circuit 222a, 242a when the additional switch 414 is open.

Figure 4C:
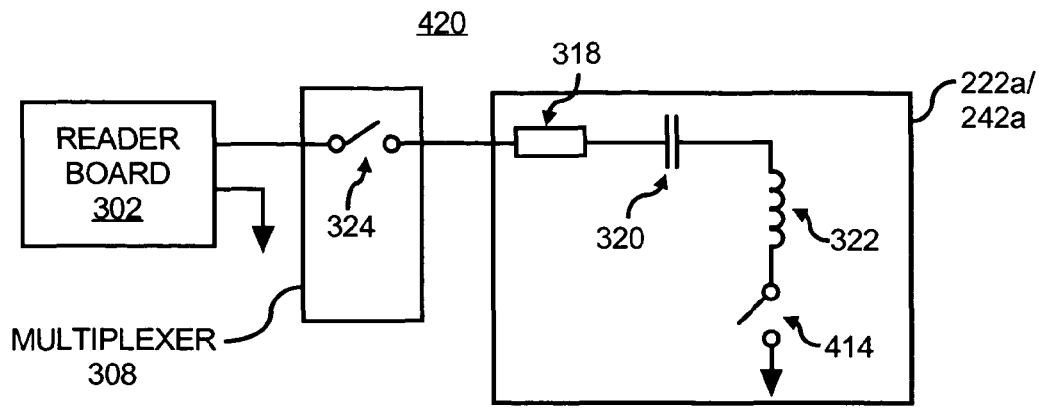

With reference now to the reader device 420 depicted in FIG. 4C, a switch 414 is shown as being positioned between the inductor 322 and the ground point. This configuration generally operates in manners similar to those discussed above with respect to the reader device 130 in FIG. 3, except that the RLC circuit of the antenna 222a, 242a is broken at a different location in the antenna 222a, 242a depicted in FIG. 4C.

Figure 4D:
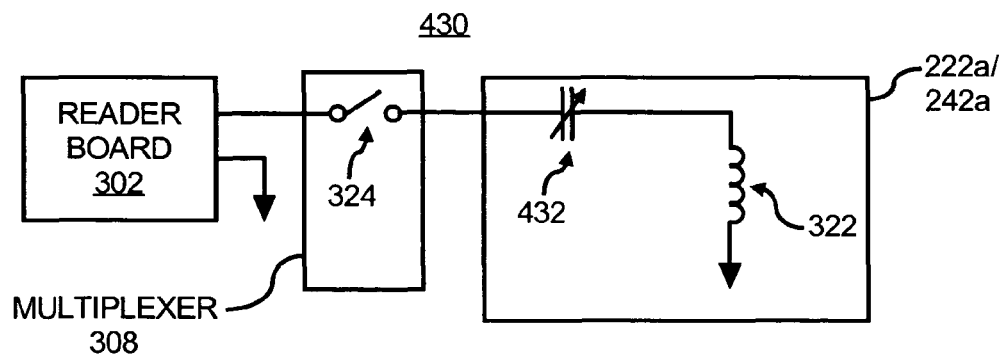

With particular reference now to FIG. 4D, the reader device 430 is depicted as including a variable capacitor 432 and no switch 324. In this example, the capacitance of the variable capacitor 432 may be varied to thereby vary the resonance frequency created by the LC circuit of the antenna 222a, 242a. For instance, the variable capacitor 432 may be set to cause the LC circuit of the antenna 222a, 242a to resonate at a frequency tuned to the associated tag 220a, whereas the variable capacitors 432 of unselected antenna circuits 222a, 222b, 242a-242n may be set to cause the unselected antenna circuits 222a, 222b, 242a-242n to resonate at one or more different frequencies. As such, if an unselected antenna circuit 222a, 222b, 242a-242n is caused to resonate by the resonance of the selected antenna circuit 222a, 242a, the tags 220a associated with the unselected antenna circuits 222a, 222b, 242a-242n may not become activated because the frequency at which their associated antenna circuits 222a, 222b, 242a-242n are resonating may not be tuned with their respective antenna circuits (not shown). In this regard, the unselected antenna circuits 222a, 222b, 242a-242n may be detuned from the selected antenna circuit 222a, 242a.

Figure 4E:
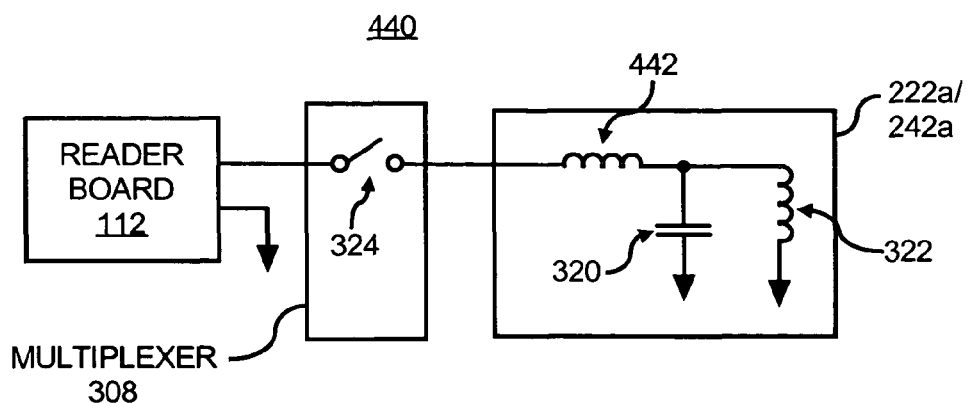

Referring now to FIG. 4E, the reader device 440 is depicted as including an additional inductor 442 and the capacitor 320 is depicted as being in parallel with the inductor 322. In this configuration, when the LC antenna circuit 222a, 222b, 242a-242n is de-selected by the controller 304, the antenna circuit 222a, 222b, 242a-242n will have a different resonance frequency as compared with activated antenna circuits 222a, 222b, 242a-242n. As such, the de-selected antenna circuits 222a, 222b, 242a-242n may be detuned from the activated antenna circuits 222a, 222b, 242a-242n.

Figure 5A:
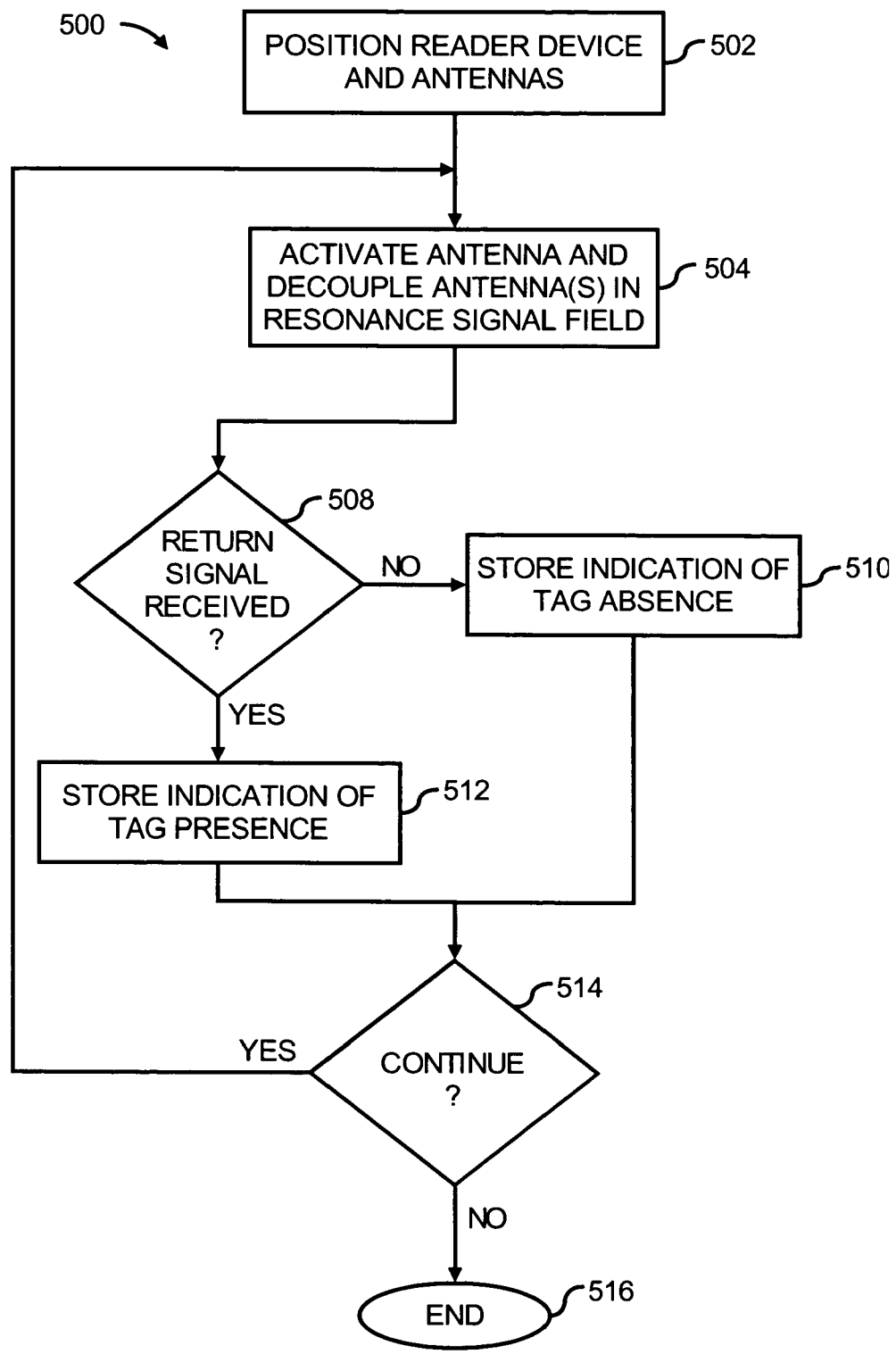
FIG. 5A shows a flow diagram of a method for tracking cables with a reader device having a plurality of antennas, according to an embodiment of the invention.

Turning now to FIG. 5A, there is shown a flow diagram of a method 500 for tracking cables with a reader device 130 having a plurality of antennas, according to an example. It is to be understood that the following description of the method 500 is but one manner of a variety of different manners in which an example of the invention may be practiced. It should also be apparent to those of ordinary skill in the art that the method 500 represents a generalized illustration and that other steps may be added or existing steps may be removed, modified or rearranged without departing from a scope of the method 500.

The description of the method 500 is made with reference to the elements depicted in FIGS. 1, 2A, 2B, 3, and 4A-4E, and thus makes reference to the elements cited therein. It should, however, be understood that the method 500 is not limited to the elements set forth in FIGS. 1, 2A, 2B, 3, and 4A-4E. Instead, it should be understood that the method 500 may be practiced by a system having a different configuration than that set forth in FIGS. 1, 2A, 2B, 3, and 4A-4E.

Generally speaking, the method 500 may be implemented to track one or both of the identities and locations of cables 116, 118 by determining whether a particular cable socket 202 supports one or more cable connectors 210, 212. The presence or absence of the cables 116, 118 may be detected through interrogation of tags 220a, 220b embedded in or otherwise attached to the cables 116, 118 or cable connectors 210, 212. This information may be stored to thereby maintain an inventory of the cables 116, 118. In addition, the method 500 may be repeated as needed or desired to update the inventory as the cables 116, 118 may be removed, moved, or replaced.

At step 502, the reader device 130 and the antennas 222a, 222b may be positioned to detect the tags 220a, 220b. The antennas 222a, 222b may be positioned on the patch panels 120 as shown in FIG. 2A prior to, during, or after the patch panels 120 are inserted into the rack 100. In one regard, the antennas 222a, 222b may be integrated with the patch panels 120 and the antennas 222a, 222b may be equipped with suitable connectors that enable relatively quick and simple connections to the reader device 130. As such, for instance, the reader device 130 may be configured to operate antennas 222a, 222b placed on multiple patch panels 120 and may also be configured to operate antennas 222a, 222b placed on patch panels 120 that are newly inserted into the rack 100.

At step 504, the controller 304 may activate at least one of the antennas 222a, 222b. Activation of at least one of the antennas 222a, 222b may be manually or automatically initiated. In the latter case, the controller 304 may be programmed to activate at least one of the antennas 222a, 222b according to a programmed routine, such as, at various times, for a set duration of time, substantially continuously, etc. In addition, or alternatively, the controller 304 may be programmed to activate at least one of the antennas 222a, 222b, for instance, when a cable 116, 118 is detected to be inserted or removed from a patch panel 120, when the assets 102a-102n are activated, etc.

In one example, the controller 304 may activate the antennas 222a, 222b in a sequential manner to thereby sequentially determine which of the cable sockets 202 currently support one or more cables 116, 118. In another example, the controller 304 may activate selected ones of the antennas 222a, 222b or to active the antennas 222a, 222b in a non-sequential order. In any regard, the controller 304 may activate the selected antenna(s) 222a, 222b through operation of the signal multiplexer 308. More particularly, for instance, with respect to FIG. 3, the signal multiplexer 308 may close the switches 324 of the selected antenna(s) 222a, 222b to thereby cause the RLC circuit of the selected antenna(s) 222a, 222b to generate a resonance signal field configured to be emitted in a direction of the tag(s) 220a, 220b associated with the selected antenna(s) 222a, 222b.

In addition, at step 504, the controller 304 may selectively activate both of the antennas 222a, 222b positioned on opposite ends of the cable sockets 202 to thereby determine whether one, both, or none of the cables 116, 118 are inserted into the cable sockets 202.

When the selected antenna(s) 222a, 222b is activated at step 504, at least one of the antennas 222a, 222b in the resonance signal field of the activated antenna(s) 222a, 222b may be decoupled from the activated antenna 222a, 222b, as indicated at step 506. In one regard, at least one of the antennas 222a, 222b may be decoupled to substantially prevent cross-coupling of signals between the active antenna(s) 222a, 222b and the other antennas 222a, 222b. The antenna(s) 222a, 222b may be decoupled from the active antenna(s) 222a, 222b in any of the manners described herein above with respect to FIGS. 3, and 4A-4D. As such, the antenna(s) 222a, 222b located within the resonance signal field of the active antenna 222a, 222b may substantially be prevented from interfering with information collected by the active antenna(s) 222a, 222b and accurate determinations of cable 116, 118 locations may be made.

Although step 506 has been illustrated as being performed substantially simultaneously with step 504, it should be understood that step 506 may be performed following step 504 without departing from a scope of the method 500. Moreover, step 506 may be performed prior to step 504 as all of the antennas 222a, 222b may initially be set to the decoupled state.

Following steps 504 and 506, the controller 304 may determine whether a response was received from one or more tags 220a, 220b, for instance, in the form of a return signal from the tag(s) 220a, 220b, at step 508. If a response was not received, the controller 304 may store an indication that a cable 116, 118 is absent from the cable socket 202 on which the active antenna 222a, 222b is positioned, at step 510. If, however, a response was received, the controller 304 may store an indication that a cable 116, 118 is present in the cable socket 202 on which the active antenna 222a, 222b is positioned, at step 512.

Following steps 510 and 512, the controller 304 may determine whether the method 500 is to be continued, at step 514. The controller 304 may determine that the method 500 is to continue, for instance, if the controller 304 determines that at least one of the antennas 222a, 222b has not been activated. In this event, which equates to a "yes" condition at step 514, steps 504-514 may be repeated for one or more of the antennas 222a, 222b. In addition, steps 504-514 may be repeated for any remaining antennas 222a, 222b that have not previously been activated. Once all or the desired number of the antennas 222a, 222b have been activated, or if the controller 304 otherwise determines that the method 500 is to be discontinued, the method 500 may end as indicated at step 516.

Figure 5B:
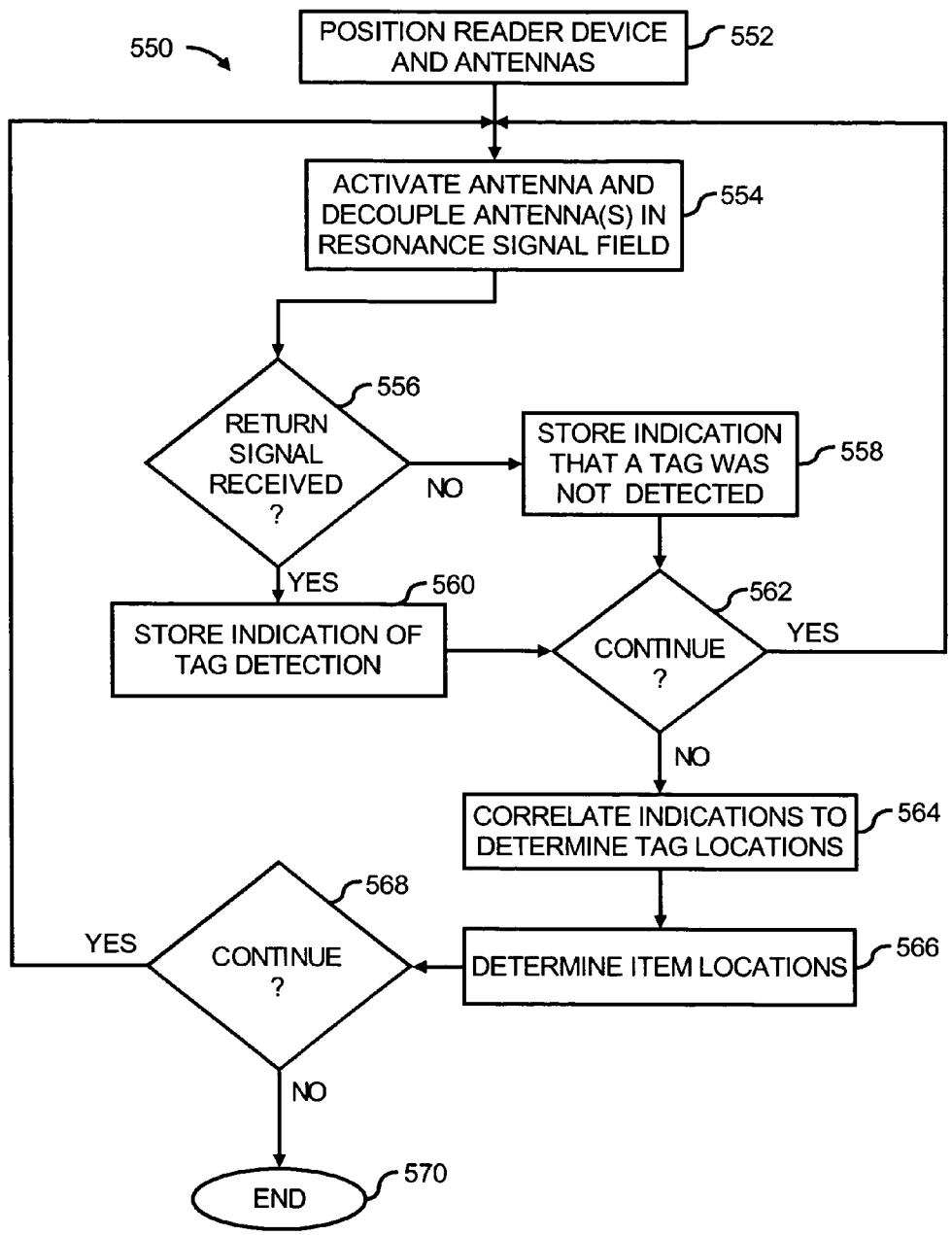
FIG. 5B shows a flow diagram of a method for tracking cables with a reader device having a plurality of antennas, according to another embodiment of the invention.

With reference now to FIG. 5B, there is shown a flow diagram of a method 550 for tracking tags 220a-220n with a reader device 130 having a plurality of overlapping antennas 242a and 242b, according to a second example. It is to be understood that the following description of the method 550 is but one manner of a variety of different manners in which an example of the invention may be practiced. It should also be apparent to those of ordinary skill in the art that the method 550 represents a generalized illustration and that other steps may be added or existing steps may be removed, modified or rearranged without departing from a scope of the method 550.

The description of the method 550 is made with reference to the elements depicted in FIGS. 1, 2C-2H, 3, and 4A-4D, and thus makes reference to the elements cited therein. It should, however, be understood that the method 550 is not limited to the elements set forth in FIGS. 1, 2C-2H, 3, and 4A-4D. Instead, it should be understood that the method 550 may be practiced by a system having a different configuration than that set forth in FIGS. 1, 2C-2H, 3, and 4A-4D.

As shown in FIG. 5B, the reader device 130 and the antennas 242a-242n may be positioned to detect the tags 220a-220n, as indicated at step 552. In one example, step 552 may be the same as step 502 in FIG. 5A. In another example, the antennas 242a-242n may be positioned to interrogate any desired number of tags 220a-220n, as discussed above with respect to FIGS. 2C-2H.

In general, the method 550 differs from the method 500 in that the method 550 includes the use of the overlapping antennas 242a-242n. In this regard, in the method 550, the overlapping antennas 242a-242n may selectively be activated at step 554 and the antennas 242a-242n in the resonance fields of the activated antennas 242a-242n may be decoupled as discussed above with respect to step 506. The antenna decoupling step 554 may, however, be considered as an optional step because the method 550 may be performed in certain instances without requiring that antennas in a resonance signal field of an activated antenna be decoupled from the activated antenna. These instances may include various instances where readings from the respective antennas 242a-242n may accurately be made without requiring that the antennas 242a-242n be decoupled from each other.

A determination as to whether a return signal is received by the selectively activated antennas 242a-242n may be made at step 556. If a response was not received, the controller 304 may store an indication that a tag 220a has not been detected, as indicated at step 558. If, however, a response was received, the controller 304 may store an indication that a tag 220a has been detected, as indicated at step 560.

At step 562, the controller 304 may determine whether the detection of tags 220a-220n is to be continued. A "yes" condition may be reached, for instance, if the controller 304 determines that at least one of the antennas 242a-242n has not been activated. If there is at least one antenna 242a-242n remaining to be activated, the controller 304 may repeat steps 554-562 to thereby interrogate any remaining tags 220a-220n associated with the antennas 242a-242n. A "no" condition may be reached at step 562 if the controller 304 determines that all or a desired number of antennas 242a-242n have been activated.

Following the "no" condition at step 562, the controller 304 may correlate the detected tag 220a-220n indications to determine the tag 220a-220n locations, as indicated at step 564. More particularly, as discussed above with respect to FIGS. 2C-2H, the controller 304 may process the information obtained by the overlapping antennas 242a-242n in a number of manners to determine the tag 220a-220n locations. In a first example, and as illustrated in FIGS. 2D and 2E, a tag 220a-220n may be considered as being located in a first location if the tag 220a-220n is detected through activation of a first set of antennas 242a-242n. In addition, a tag 220a-220n may be considered as being located in a second location if the tag 220a-220n is detected through activation of a second set of antennas 242a-242n. The locations of the remaining tags 220a-220n may be determined in similar manners.

In another example, and as illustrated in FIG. 2G, a tag 220a may be determined to be in a first location if the tag 220a responded when the tag 220a was interrogated by either of a first antenna 242a and a second antenna 242b. Alternatively, the tag 220a may be determined to be in the first location if the tag 220a responded when the tag 220a was interrogated by both of the first antenna 242a and the second antenna 242b.

In a further example, and as illustrated in FIG. 2H, the controller 304 may determine that the tag 220a associated with a first item 246a is in a first location if that tag 220a responds when interrogated by the first antenna 242a, but does not respond when interrogated by the second antenna 242b. Likewise, the reader device 130 may determine that the tag 220a associated with a second item 246b is in a second location if that tag 220a responds when interrogated by the first antenna 242a and when interrogated by the second antenna 242b. Moreover, the reader device 130 may determine that the tag 220a associated with a third item 246c is in a third location if that tag 220a responds when interrogated by the second antenna 242b, but does not respond when interrogated by the first antenna 242a.

Following a determination of the tag 220a-220n locations at step 558, the locations of the items 246a-246n may be determined at step 566. The item 246a-246n locations may be determined by correlating the tags 220a-220n with their associated items 246a-246n. In addition, the item 246a-246n locations may be stored, outputted, or both. Step 566 may be considered to be optional because the tags 220a-220n may not, in certain instances, be associated with any of the items 246a-246n and the locations of the tags 220a-220n may comprise the desired output.

In any regard, the controller 304 may determine whether the method 550 is to be continued, at step 568. The controller 304 may determine that the method 550 is to continue, for instance, if the controller 304 determines that at least one of the antennas 242a-242n has not been activated. In this event, which equates to a "yes" condition at step 568, steps 554-568 may be repeated for one or more of the antennas 242a-242n. In addition, steps 554-568 may be repeated for any remaining antennas 242a-242n that have not previously been activated. Once all or the desired number of the antennas 242a-242n have been activated, or if the controller 304 otherwise determines that the method 550 is to be discontinued, the method 550 may end as indicated at step 570.

Some or all of the operations set forth in the methods 500 and 550 may be contained as a utility, program, or subprogram, in any desired computer accessible medium. In addition, the methods 500 and 550 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 6:
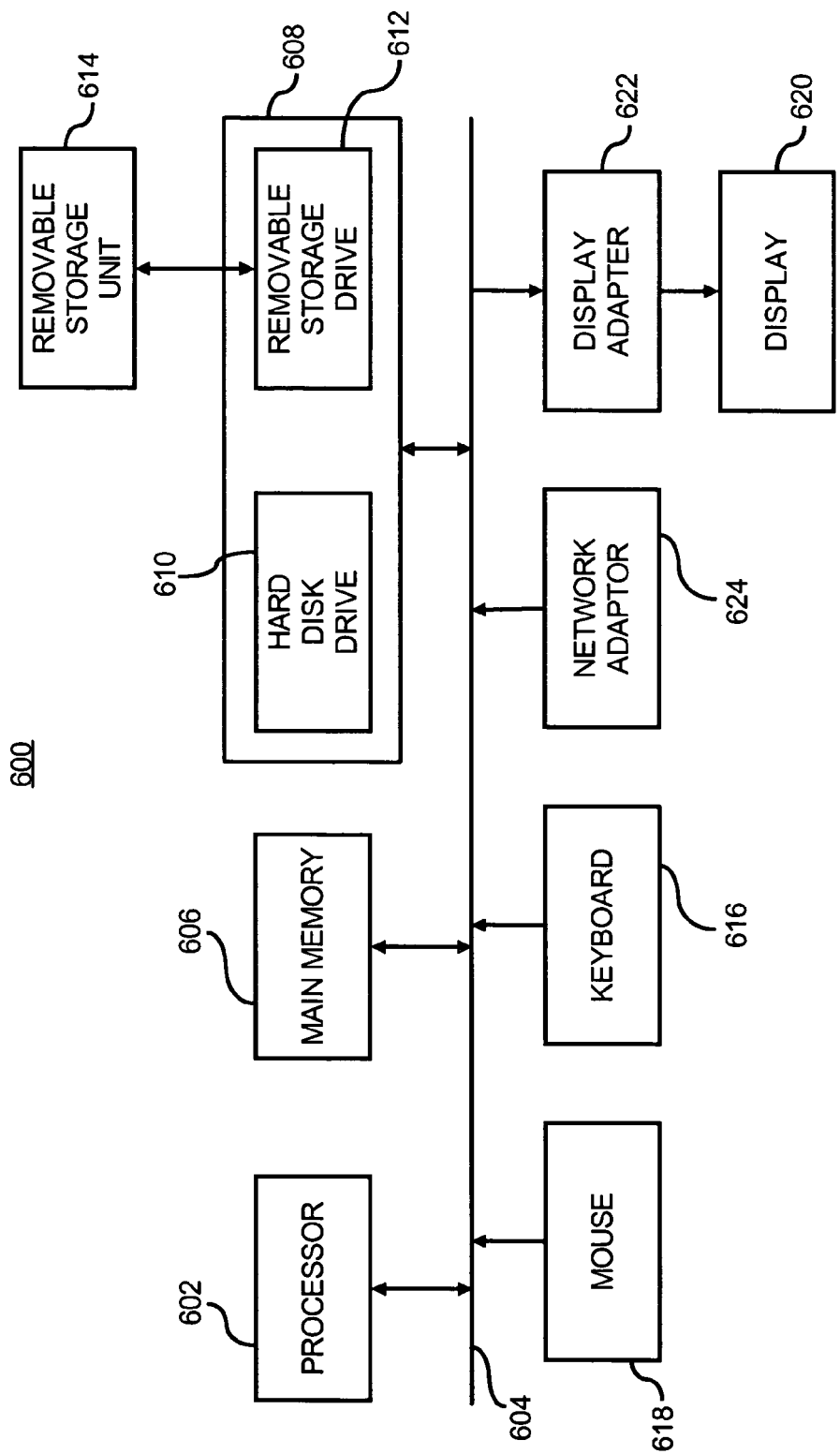
FIG. 6 illustrates a computer system, which may be employed to perform various functions described herein, according to an embodiment of the invention.

FIG. 6 illustrates a computer system 600, which may be employed to perform the various functions of the controller 304 described herein above, according to an example. In this respect, the computer system 600 may be used as a platform for executing one or more of the functions described hereinabove with respect to the controller 304.

The computer system 600 includes a processor 602 that may be used to execute some or all of the steps described in the methods 500, 550. Commands and data from the processor 602 are communicated over a communication bus 604. The computer system 600 also includes a main memory 606, such as a random access memory (RAM), where the program code for, for instance, the controller 304, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for tracking tags may be stored. In addition, information pertaining to at least one of the locations of the tags 220a-220n and the identities of the cables 116, 118 or other items 246a-246n may also be stored in at least one of the main memory 606 and the secondary memory 608.

The removable storage drive 610 may read from and/or write to a removable storage unit 614 in a well-known manner. User input and output devices may include, for instance, a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

It will be apparent to one of ordinary skill in the art that other known electronic components may be added or substituted in the computer system 600. In addition, the computer system 600 may include a system board or blade used in a rack in a data center, a conventional "white box" server or computing device, etc. Also, one or more of the components in FIG. 6 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A system comprising:
an electronics cabinet housing a plurality of assets having respective RFID tags, wherein the plurality of assets are arranged at predefined intervals in the electronics cabinet, said predefined intervals having a dimension that extends at least one predefined measurement unit;
a reader device having a plurality of loop antennas positioned on the electronics cabinet such that portions of at least two of the plurality of loop antennas physically overlap each other and are in approximately the same plane, wherein pairs of the overlapping loop antennas are positioned with respect to respective RFID tags of the plurality of assets, such that each of the RFID tags is within both signal fields of a respective pair of overlapping antennas; and
wherein the reader device is configured to selectively activate the plurality of overlapping antennas to thereby selectively interrogate the RFID tags, and wherein the reader device is configured to use the selective interrogation of the RFID tags to deduce the locations of the RFID tags and the plurality of assets upon which the RFID tags are provided with respect to the electronics cabinet.

2. The system according to claim 1, wherein each of the overlapping plurality of loop antennas comprises separate loop antennas.

3. The system according to claim 1, wherein the electronics cabinet includes a door, wherein the overlapping loop antennas are attached to the door, and wherein the overlapping antennas are configured to move into a position to interrogate the RFID tags when the door is in a substantially closed position.

4. The system according to claim 1, wherein at least one pair of overlapping loop antennas is positioned within one predefined measurement unit of the electronics cabinet.

5. The system according to claim 4, wherein the reader device is configured to determine that an RFID tag is in a predetermined location of the electronics cabinet based on the presence or absence of a response being received from the RFID tag when at least one of the overlapping loop antennas is selectively activated.

6. The system according to claim 4, wherein the reader device is configured to determine that an RFID tag is in a predetermined location of the electronics cabinet based on the presence or absence of a response being received from the RFID tag when at least two of the overlapping loop antennas are selectively activated.

7. The system according to claim 4, wherein the reader device is configured to determine that an RFID tag is absent from a predetermined location of the electronics cabinet in response to at least one of the overlapping loop antennas failing to receive a response from the RFID tag.

8. The system according to claim 1, wherein at least one pair of overlapping loop antennas is positioned to detect RFID tags located at multiple measurement of the electronics cabinet.

9. The system according to claim 8, wherein the reader device is configured to determine that a first RFID tag is in a first predetermined location of the electronics cabinet by a response being received from the first RFID tag when a first one of the overlapping loop antennas is selectively activated, that a second RFID tag is in a second predetermined location of the electronics cabinet by a response being received from the second RFID tag when the first one and a second one of the overlapping loop antennas are selectively activated, that a third RFID tag is in a third predetermined location of the electronics cabinet by a response being received from the third RFID tag when the second one of the overlapping loop antennas is selectively activated.

10. A method of tracking a plurality of assets having respective RFID tags, wherein the plurality of assets are arranged at predefined intervals in an electronics cabinet, said predefined intervals having a dimensions that extends at least one predefined measurement unit with a reader device having multiple loop antennas, said method comprising:
   arranging the loop antennas on the electronics cabinet to be in relatively close proximity to respective RFID tags of the plurality of assets, such that portions of at least two of the loop antennas physically overlap each other and are approximately in the same plane and that the respective RFID tags are within signal fields of more than one of the overlapping loop antennas;
   selectively activating the overlapping loop antennas to emit radio frequency (RF) signals to interrogate the RFID tags in the overlapping fields;
   determining whether a response is received from at least one of the RFID tags to thereby track the locations of the RFID tags; and
   tracking the locations of the assets with respect to the electronics cabinet based upon responses received from the at least one of the RFID tags.

11. The method according to claim 10, wherein placing the overlapping loop antennas further comprises placing the overlapping loop antennas along a door of the electronics cabinet, such that the overlapping loop antennas are configured to move into a position to interrogate the RFID tags when the door is in a substantially closed position.

12. The method according to claim 10, wherein selectively activating the overlapping loop antennas further comprises:
   activating a first antenna of the overlapping loop antennas;
   determining whether a response is received from at least one of the RFID tags in response to activation of the first antenna;
   activating a second antenna of the overlapping loop antennas; and
   determining whether a response is received from the at least one of the RFID tags in response to activation of the second antenna.

13. The method according to claim 12, wherein placing the overlapping loop antennas further comprises placing at least one pair of overlapping antennas within one measurement unit of the electronics cabinet.

14. The method according to claim 13, further comprising:
   indicating that an RFID tag is present in a location of the electronics cabinet in response to a determination that a response has been received from the RFID tag in response to activation of at least one of the first antenna and the second antenna.

15. The method according to claim 13, further comprising:
   indicating that an RFID tag is present in a predetermined location of the electronics cabinet in response to a determination that a response has been received from the RFID tag in response to activation of both the first antenna and the second antenna.

16. The method according to claim 13, further comprising:
   indicating that an RFID tag is absent from a predetermined location of the electronics cabinet in response to a determination that a response has not been received from the RFID tag in response to activation of at least one of the first antenna and the second antenna.

17. The method according to claim 12, wherein placing the overlapping loop antennas further comprises placing at least one pair of overlapping loop antennas in relatively close proximity to an RFID tag, such that each of the at least one pair of overlapping loop antennas is positioned to span multiple measurement units within the housing.

18. The method according to claim 17, further comprising:
   indicating that a first RFID tag is present in a first measurement unit location of the electronics cabinet in response to a determination that a response has been received in response to activation of the first antenna and not to activation of the second antenna;
   indicating that a second RFID tag is present in a measurement unit location of the electronics cabinet in response to a determination that a response has been received in response to activation of both the first antenna and the second antenna; and
   indicating that a third RFID tag is present in a measurement unit location of the electronics cabinet in response to a determination that a response has been received in response to activation of the second antenna and not to activation of the first antenna.

19. The method according to claim 10, wherein the plurality of antennas are closely packed, the method further comprising:
   activating one of said closely packed overlapped loop antennas to generate a resonance signal field configured to interrogate an RFID tag associated with the active antenna; and
   detuning at least one antenna positioned within the resonance signal field of the active antenna to substantially prevent cross-coupling of signals between the active antenna and the at least one of the antennas positioned within the resonance signal field.

20. An electronics cabinet comprising:

a plurality of assets having respective RFID tags housed in the electronics cabinet, wherein the plurality of assets are arranged at predefined intervals in the electronics cabinet, said predefined intervals having a dimension that extends at least one predefined measurement unit;

a reader device having a plurality of loop antennas, said plurality of loop antennas being positioned on the electronics cabinet such that portions of at least two of the plurality of loop antennas physically overlap each other and are in approximately the same plane, wherein pairs of the overlapping loop antennas are configured to be positioned with respect to respective RFID tags of the plurality of assets, such that each of the RFID tags is within both signal fields of a respective pair of overlapping loop antennas; and a controller configured to selectively activate the plurality of overlapping loop antennas to thereby selectively interrogate one or more of the RFID tags, and wherein the controller is configured to use the selective interrogation of the one or more RFID tags to deduce the locations of the RFID tags and the plurality of assets upon which the RFID tags are provided with respect to the apparatus electronics cabinet.

* * * * *

UNITED STATES PATENT AND TRADEMARK OFFICE
CERTIFICATE OF CORRECTION

| | | |
|---|---|---|
| PATENT NO. | : 7,806,333 B1 | Page 1 of 1 |
| APPLICATION NO. | : 11/582753 | |
| DATED | : October 5, 2010 | |
| INVENTOR(S) | : Alan McReynolds et al. | |

It is certified that error appears in the above-identified patent and that said Letters Patent is hereby corrected as shown below:

In column 24, line 11, in Claim 20, after "the" delete "apparatus".

Signed and Sealed this
Twenty-fourth Day of April, 2012

David J. Kappos
*Director of the United States Patent and Trademark Office*